(12) United States Patent
Singh

(10) Patent No.: US 12,217,881 B2
(45) Date of Patent: *Feb. 4, 2025

(54) STORAGE AND TRANSPORT CASK FOR NUCLEAR WASTE

(71) Applicant: HOLTEC INTERNATIONAL, Camden, NJ (US)

(72) Inventor: Krishna P. Singh, Jupiter, FL (US)

(73) Assignee: HOLTEC INTERNATIONAL

( * ) Notice: Subject to any disclaimer, the term of this patent is extended or adjusted under 35 U.S.C. 154(b) by 0 days.

This patent is subject to a terminal disclaimer.

(21) Appl. No.: 18/451,885

(22) Filed: Aug. 18, 2023

(65) Prior Publication Data

US 2024/0029906 A1 Jan. 25, 2024

Related U.S. Application Data

(63) Continuation of application No. 17/831,809, filed on Jun. 3, 2022, now Pat. No. 11,769,602, which is a continuation of application No. 17/181,439, filed on Feb. 22, 2021, now Pat. No. 11,373,775.

(60) Provisional application No. 62/979,640, filed on Feb. 21, 2020.

(51) Int. Cl.
*G21F 5/12* (2006.01)

(52) U.S. Cl.
CPC ..................... *G21F 5/12* (2013.01)

(58) Field of Classification Search
CPC ........................................................ G21F 5/12
USPC ....... 250/505.1, 506.1, 507, 1, 515.1, 516.1, 250/517.1, 518.1, 519.1
See application file for complete search history.

(56) References Cited

U.S. PATENT DOCUMENTS

| | | | |
|---|---|---|---|
| 4,851,286 A | 7/1989 | Maurice | |
| 4,883,637 A | 11/1989 | McDaniels, Jr. | |
| 4,996,019 A | 2/1991 | Catalayoud et al. | |
| 5,037,147 A | 8/1991 | Fay | |
| 5,127,535 A | 7/1992 | Shinno | |
| 10,692,617 B2 | 6/2020 | Singh | |
| 11,373,775 B2 * | 6/2022 | Singh | G21F 5/12 |
| 11,610,696 B2 * | 3/2023 | Singh | G21F 5/14 |

(Continued)

FOREIGN PATENT DOCUMENTS

| | | |
|---|---|---|
| DE | 102008060654 A1 | 7/2010 |
| JP | H2-095898 A | 7/1990 |

(Continued)

*Primary Examiner* — Nicole M Ippolito
(74) *Attorney, Agent, or Firm* — The Belles Group, P.C.

(57) ABSTRACT

A nuclear waste cask in one embodiment includes an axially elongated cask body defining a longitudinally-extending opening forming an entrance to an internal storage cavity of the cask configured for holding radioactive nuclear waste materials. A closure lid detachably coupled to the cask body at the top opening seals the cavity. A cask locking mechanism includes a plurality of first locking protrusions spaced apart on the lid which are selectively interlockable with a plurality of second locking protrusions spaced apart on the cask body to lock the lid to the cask body. The first locking protrusions may be disposed on slideable locking bars moveable between locked and unlocked positions while the lid remains stationary on the cask body. Hydraulic or pneumatic actuators may be used to change position of the locking bars. The cask and lid may include other features such as impact absorbers and lifting elements.

13 Claims, 29 Drawing Sheets

(56) References Cited

U.S. PATENT DOCUMENTS

| | | | |
|---|---|---|---|
| 11,769,602 B2 * | 9/2023 | Singh | G21F 5/12 250/517.1 |
| 2015/0090686 A1 | 4/2015 | Batzel et al. | |
| 2018/0005718 A1 | 1/2018 | Singh | |
| 2021/0272714 A1 | 9/2021 | Singh | |
| 2022/0367079 A1 | 11/2022 | Singh | |

FOREIGN PATENT DOCUMENTS

| | | |
|---|---|---|
| KR | 10-1986-0003621 | 5/1986 |
| WO | 2021168401 A1 | 8/2021 |

* cited by examiner

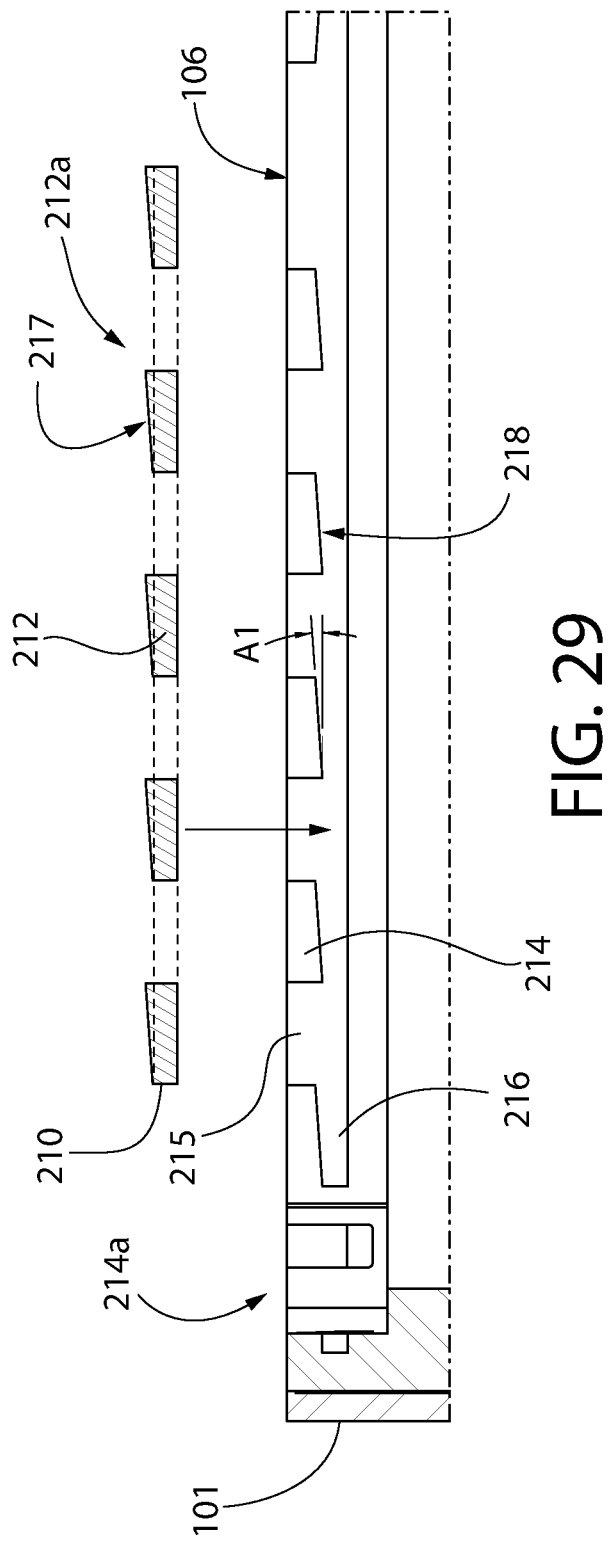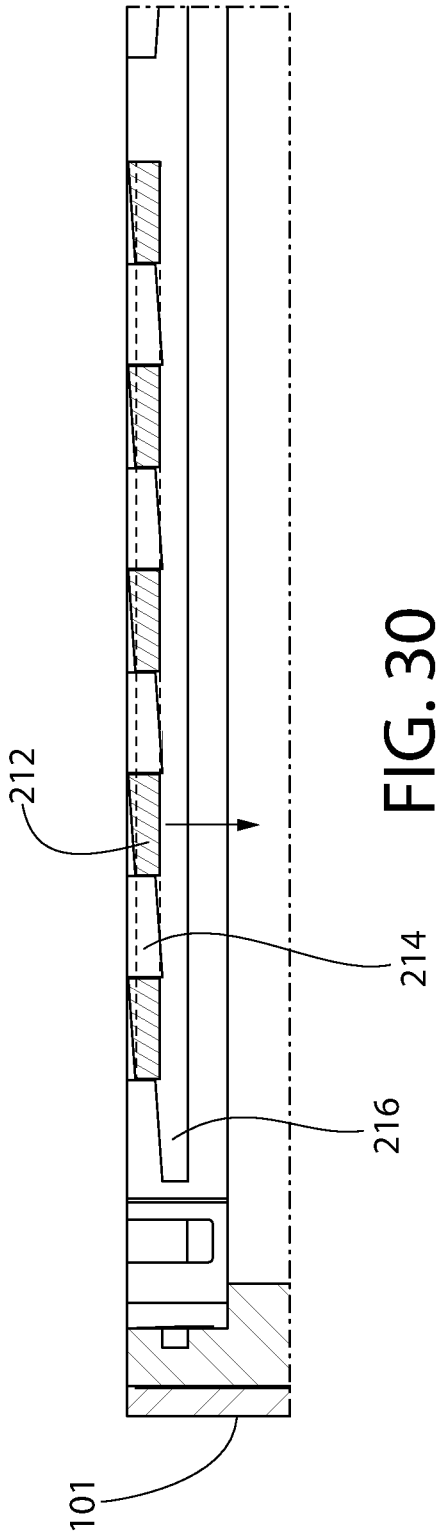

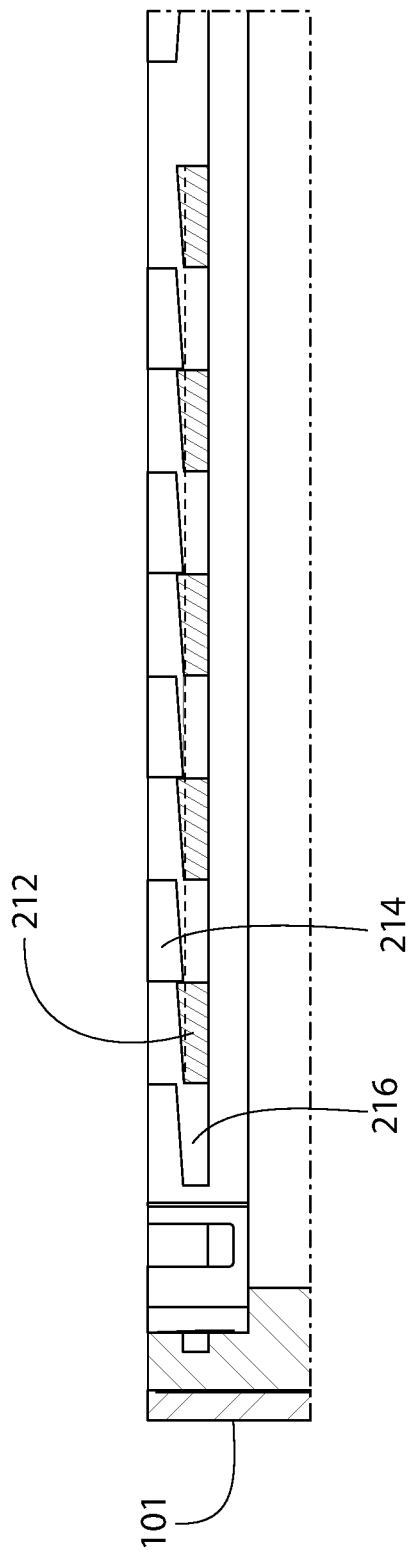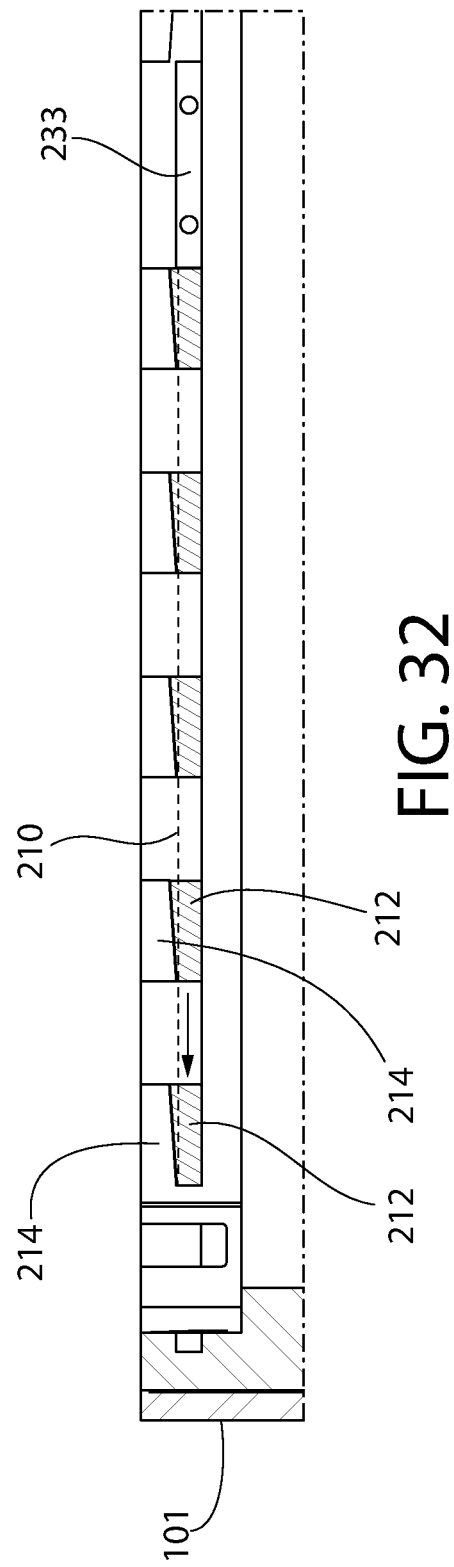

STORAGE AND TRANSPORT CASK FOR NUCLEAR WASTE

CROSS-REFERENCE TO RELATED APPLICATIONS

This application is a continuation of U.S. patent application Ser. No. 17/831,809 filed Jun. 3, 2022, which is a continuation of U.S. patent application Ser. No. 17/181,439 filed Feb. 22, 2021, which claims the benefit of U.S. Provisional Application No. 62/979,640 filed Feb. 21, 2020; which are all incorporated herein by reference in their entireties.

BACKGROUND

The present invention relates generally to systems and vessels for transporting and storing high level radioactive nuclear waste materials, and more particularly to a box-type cask in one embodiment for transport and storage of radioactive nuclear waste materials.

The overpacks or casks used to store neutron activated metal and other radiated non-fissile high level radioactive waste, such as that resulting from operation nuclear power generation plants or other type facilities, is typically an open-top cylindrical structure with a bolted circular lid. Such a cask is inefficient to load all types of nuclear waste materials not limited to spent nuclear fuel into the cask. The radiation waste materials are often too large and/or may be irregular shaped for insertion through the narrow top access opening in such cylindrical casks which leads to the internal storage cavity. Further, the act of tightening the bolts once the cylindrical cask is packed with nuclear waste materials is a time consuming which exposes the workers to radiation dosage in proportion to the time needed to complete the tedious installation of the closure bolts.

Accordingly, there remains a need for an improved nuclear waste storage cask that can accommodate a wide variety of waste materials, and which can further be closed and sealed in an expedient manner to reduce radiation exposure of operating personnel handling the cask.

BRIEF SUMMARY

The present application provides a nuclear waste storage system comprising a radiation-shielded nuclear waste storage cask which overcomes the shortcomings of the foregoing cylindrical type storage casks described above for storing a wide variety of different nuclear waste materials. In one embodiment, a longitudinally elongated box-type cask is disclosed comprising an essentially rectangular body with rectilinear cross sectional internal storage cavity configured for holding nuclear waste material, and a matching rectangular closure lid. The elongated large top opening leading into the storage cavity extends for a majority of the longitudinal length of the cask. In contrast to the small circular opening at the top of cylindrical casks, the present rectangular opening allows large and irregular shaped radioactive metal pieces of waste material to be loaded inside the cask storage cavity in an efficient and expedient manner without undue handling by operating personnel, thereby reducing potential radiation dosage.

In one embodiment, the closure lid be coupled and sealed to the cask body to close the top opening through a quick connect-disconnect joint that does not utilize any threaded fasteners. Instead, a slider locking mechanism comprising mechanically interlocking protrusions provided on peripheral portions of each of the lid and correspondingly cask body around the cask top opening is employed. While the lid remains stationary on the cask body, the locking protrusions on the lid are slideably relative to the locking protrusions on the cask body between locked and unlocked positions or states. The locking protrusions may be arrayed and spaced apart perimetrically around the lid and cask body. The locking protrusions may be wedge-shaped in one embodiment to produce a wedging-action when mutually engaged which effectively locks the lid to the cask body and seals the nuclear waste contents inside the cask. A gasket at the lid to cask body interface is compressed by the wedging-action to form a gas-tight seal of the cask storage cavity which completes the containment barrier. There is no exchange of air between the ambient environment and the storage cavity in one embodiment.

The term "nuclear waste material" as used herein shall be broadly construed to mean any type or form of radioactive waste material which has been irradiated by a source of radiation. Such irradiation may occur in a nuclear power generation plant with nuclear reactor, or other types of facilities. As one non-limiting example, the radioactive nuclear waste materials may be associated with decommissioning or repair/maintenance of a nuclear facility, and may therefore include a wide variety of sizes and shapes of pieces of equipment (including parts of the reactor), structural components/members, parts, debris, scrap, or similar which have been irradiated and generate radiation.

In one aspect, a cask for containing radioactive materials comprises: a cask body comprising an opening forming a passageway into an internal storage cavity of the cask; a closure lid configured to be detachably coupled to the cask body to enclose the opening; and a locking mechanism comprising at least one first locking member and at least one second locking member, the first and second locking members slideable relative to one another to alter the locking mechanism between: (1) a first state in which the closure lid can be removed from the cask body; and (2) a second state in which the first and second locking members engage one another to prevent the closure lid from being removed from the cask body.

According to another aspect, a cask for containing radioactive materials comprises: a longitudinal axis; an axially elongated cask body defining a top opening forming an entrance to an internal storage cavity of non-cylindrical cross-sectional configuration, the cavity configured for holding radioactive waste materials; and a closure lid detachably coupled to the cask body at the top opening.

According to another aspect, a method for locking a radioactive waste storage cask comprises: positioning a closure lid on a cask body over an opening leading into an internal storage cavity; inserting a peripheral array of first locking protrusions on the lid between and through a peripheral array of second locking protrusions disposed on the cask body around the opening; slideably moving the first locking protrusions beneath the second locking protrusions; and frictionally engaging the first locking protrusions with the second locking protrusions; wherein the lid cannot be removed from the cask body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which:

FIG. 29 is a first schematic diagram of a sequential method for locking the cask of FIG. 1;

FIG. 30 is a second schematic diagram thereof;

FIG. 31 is a third schematic diagram thereof; and

FIG. 32 is a fourth schematic diagram thereof.

Figure 1:
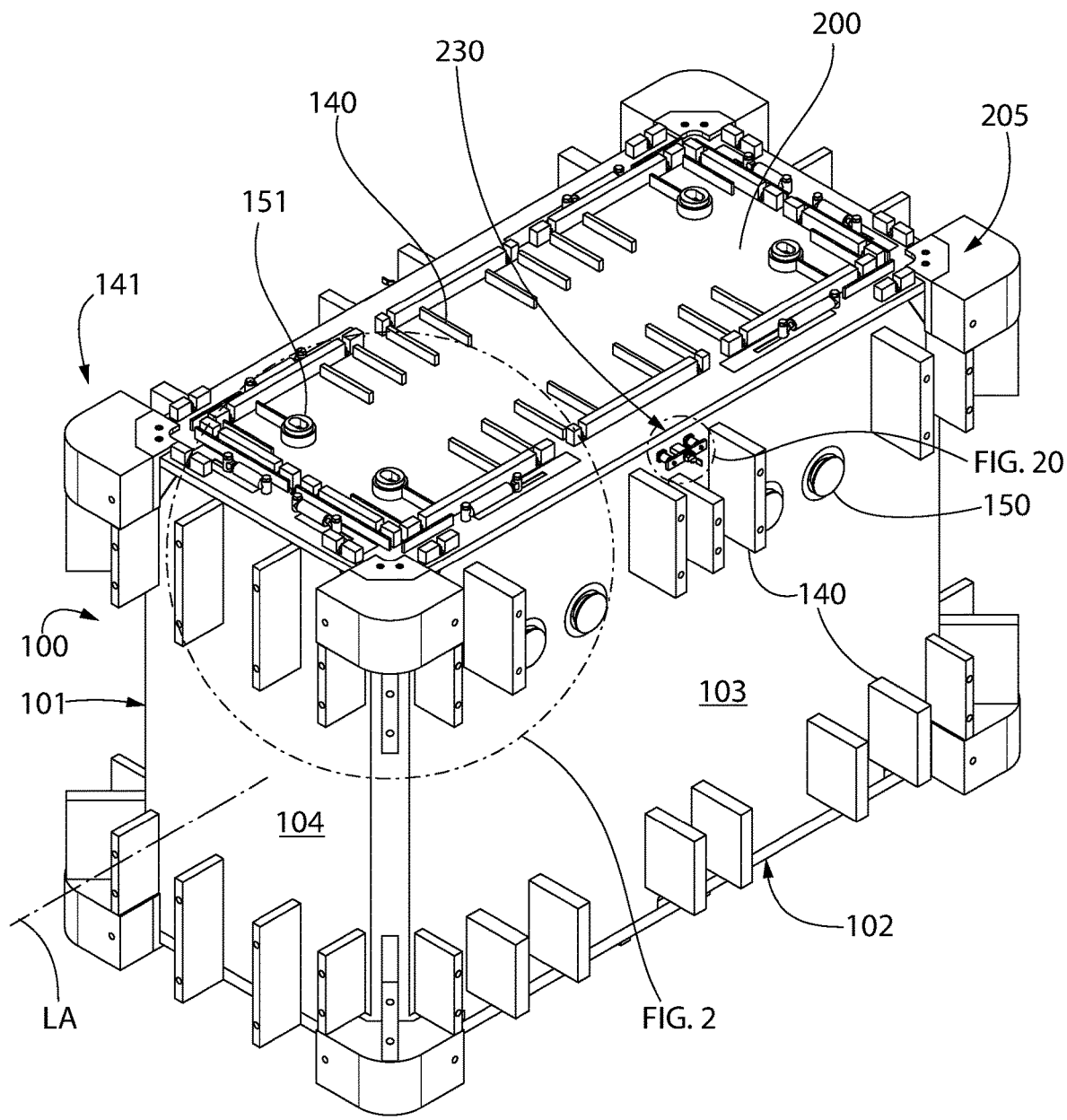
FIG. 1 is top perspective view of a polygonal cask configured for storage of nuclear waste materials according to one embodiment of the present disclosure.
Figure 2:
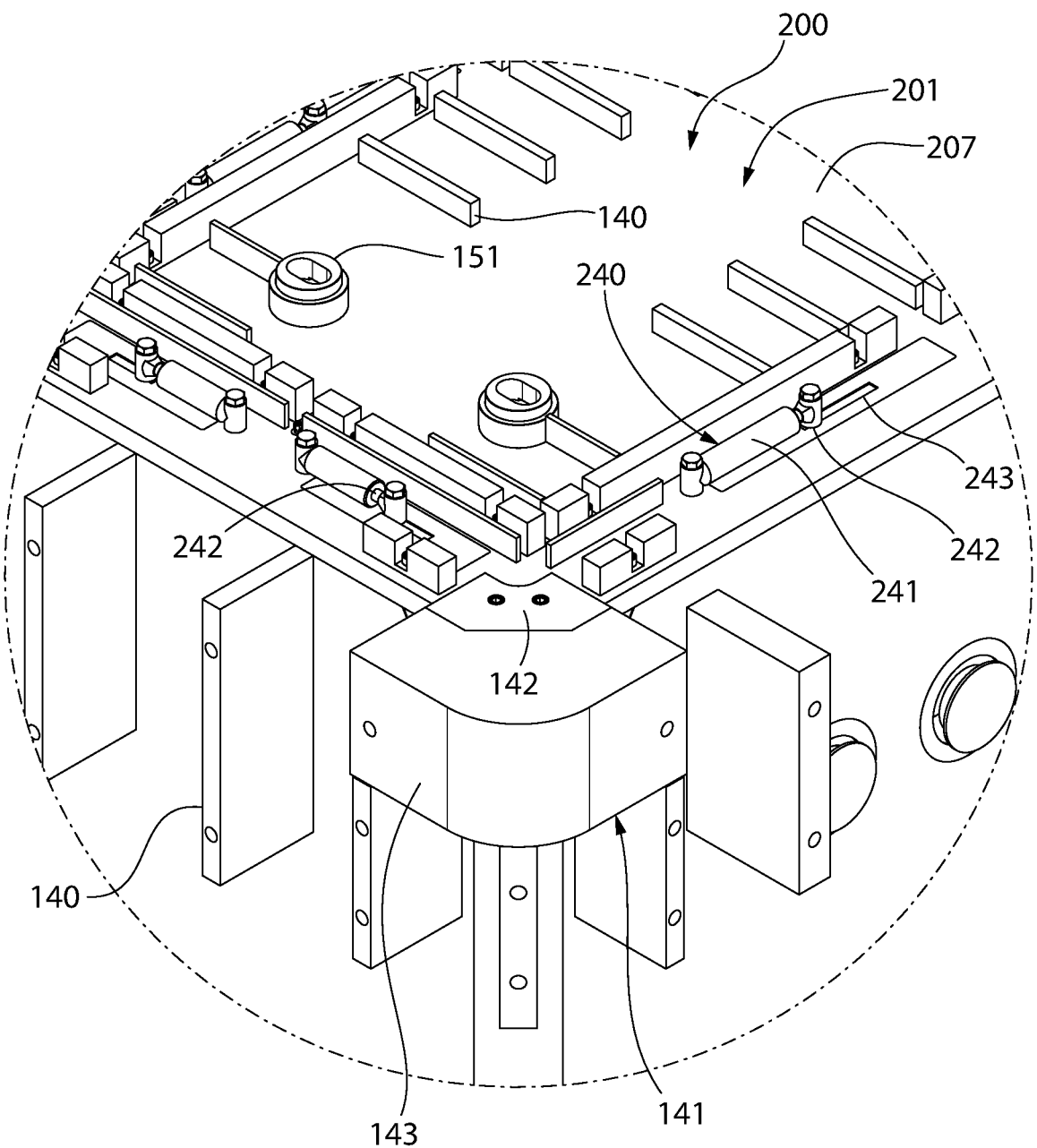
FIG. 2 is an enlarged detail taken from FIG. 1.
Figure 3:
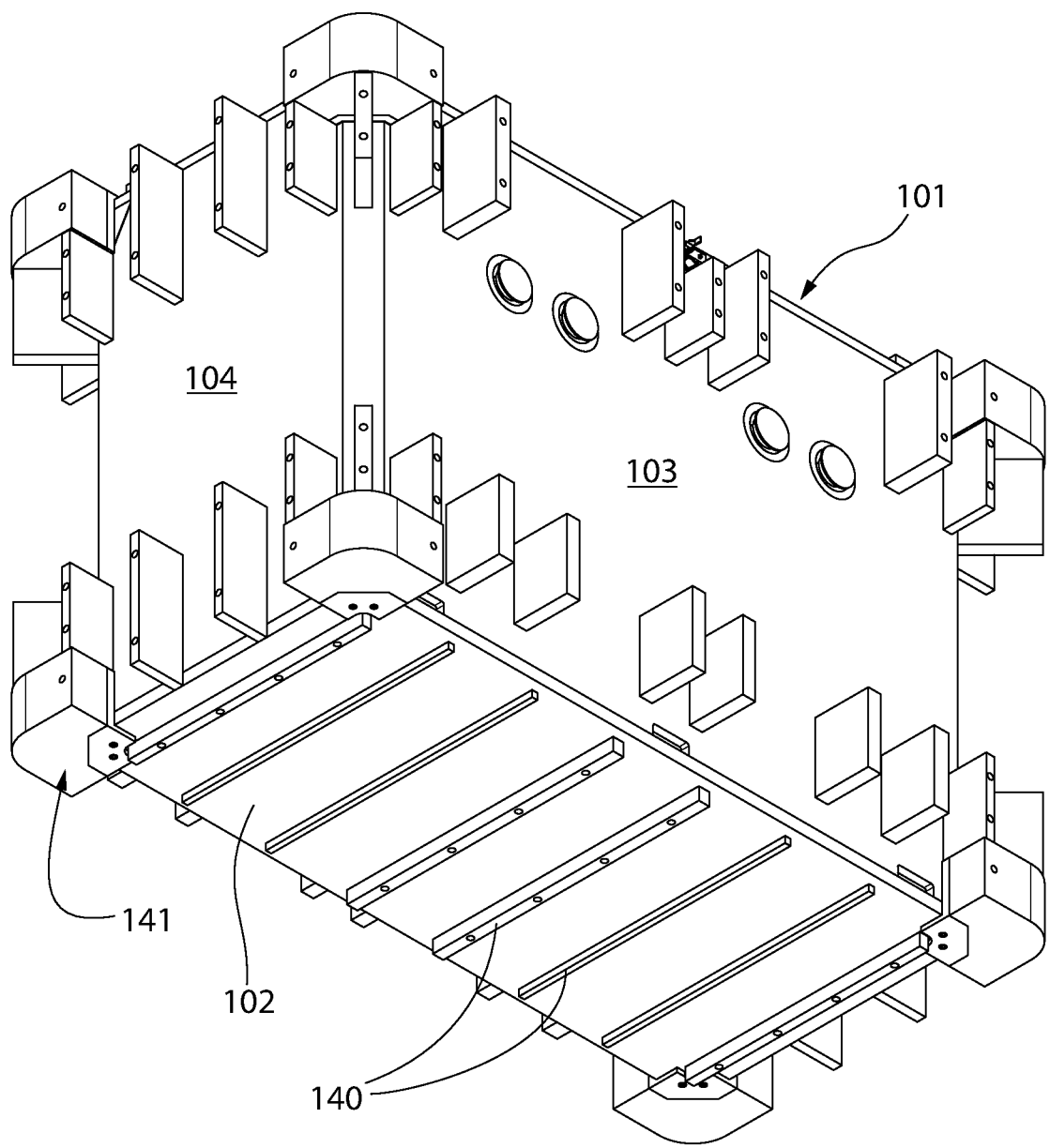
FIG. 3 is a bottom perspective view of the cask of FIG. 1.
Figure 4:
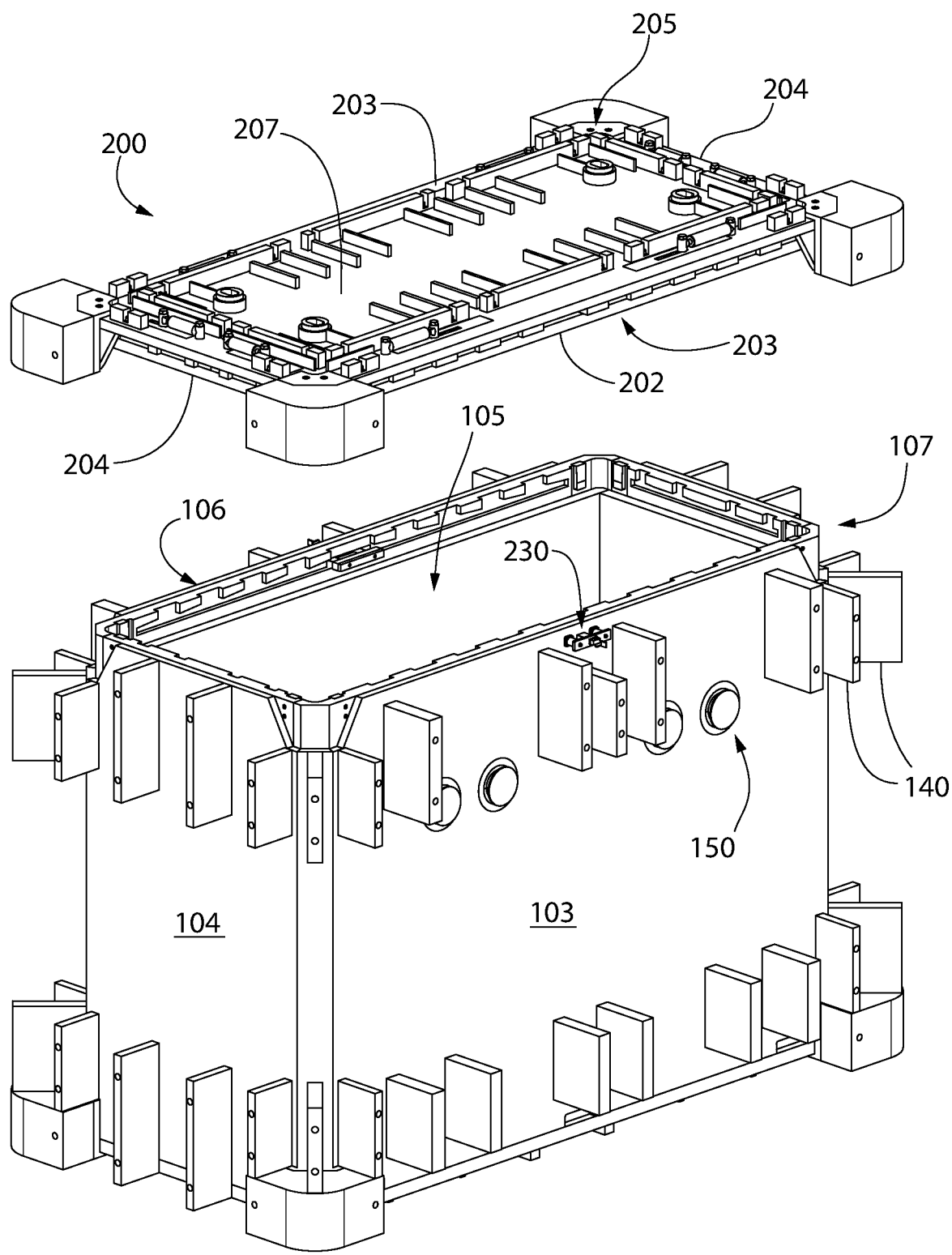
FIG. 4 is an exploded top perspective view thereof showing the lid removed.
Figure 5:
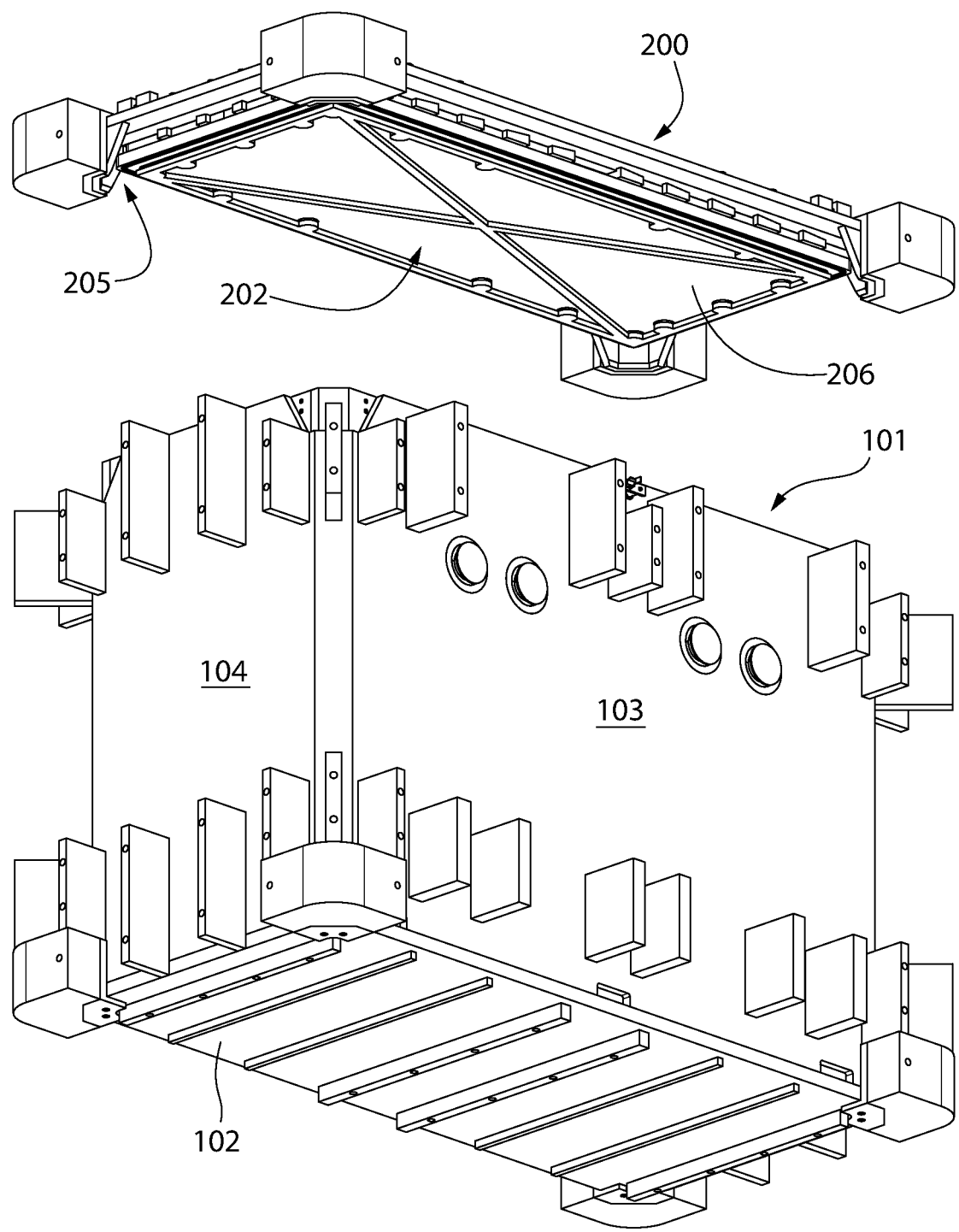
FIG. 5 is an exploded bottom perspective view thereof.
Figure 6:
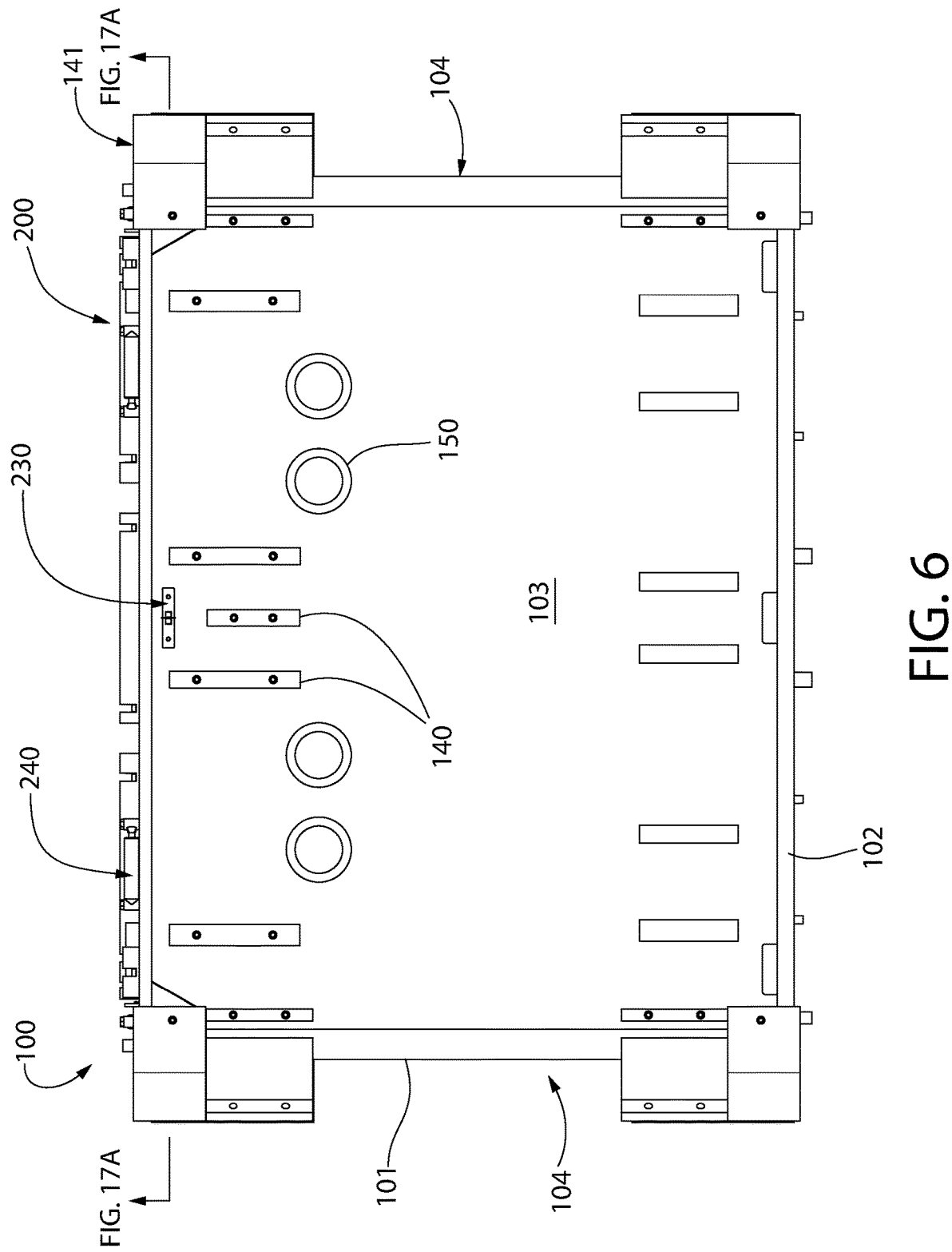
FIG. 6 is a longitudinal side elevation view thereof.
Figure 7:
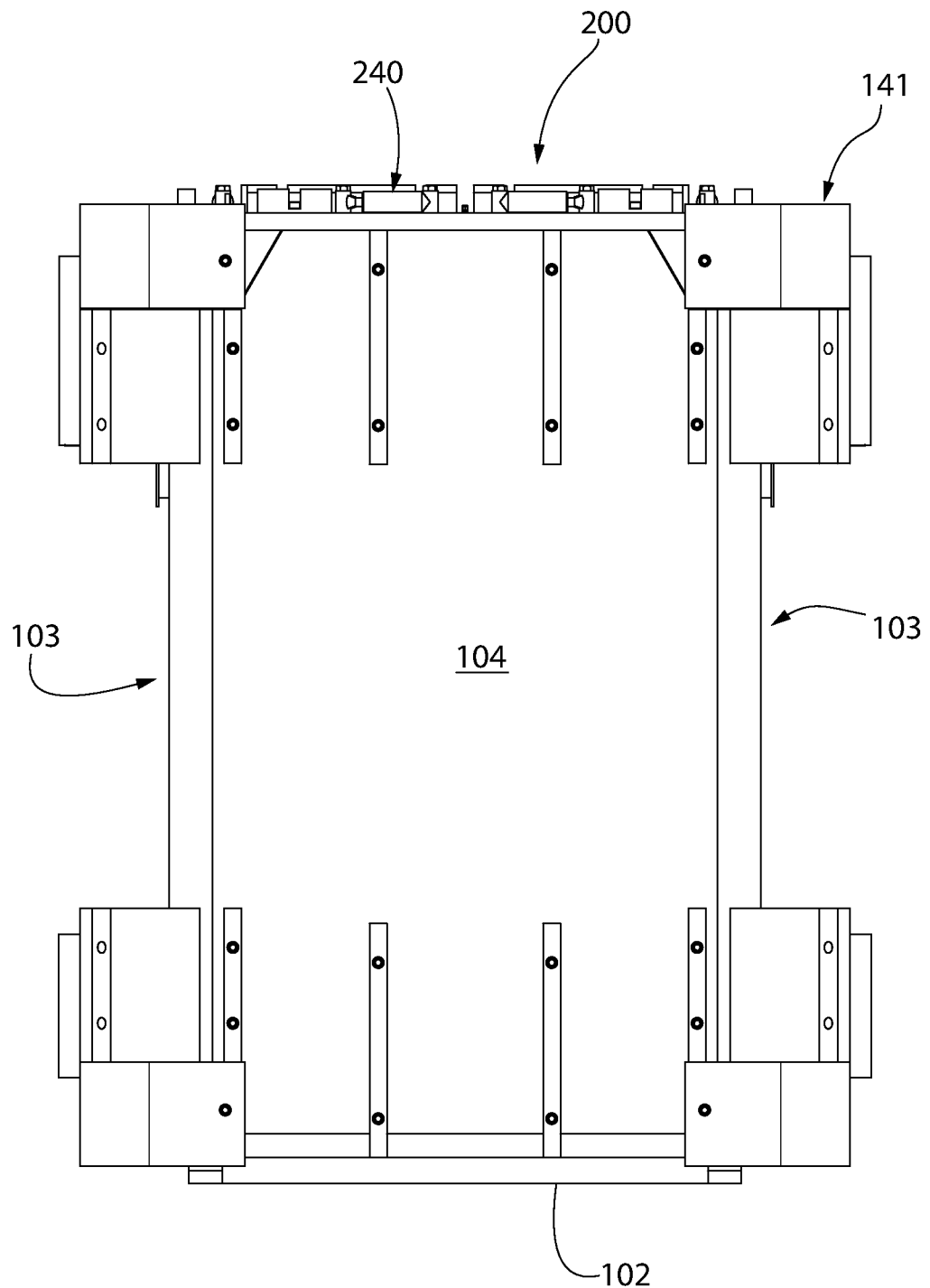
FIG. 7 is a lateral end elevation view thereof.
Figure 8:
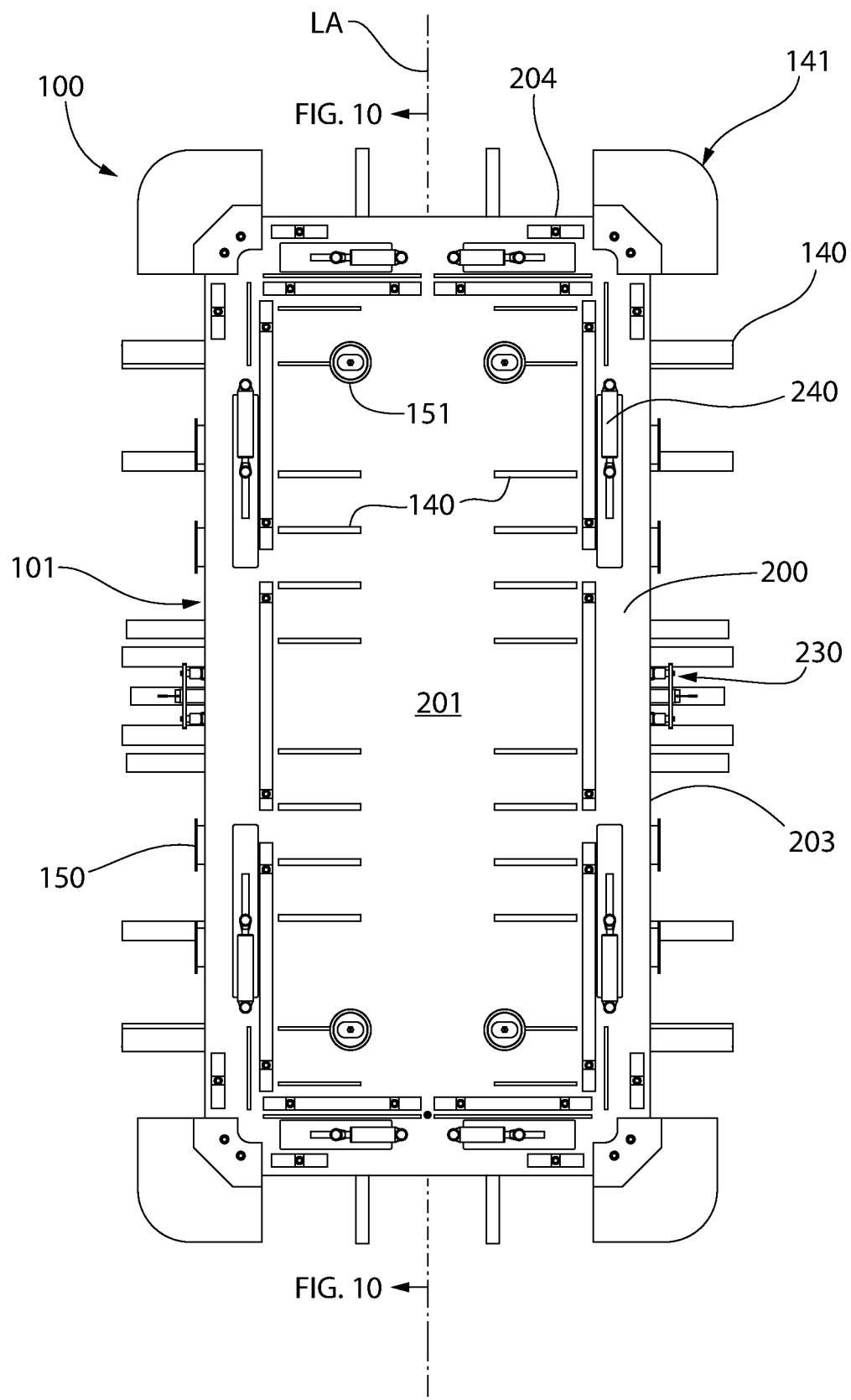
FIG. 8 is a top plan view thereof.
Figure 9:
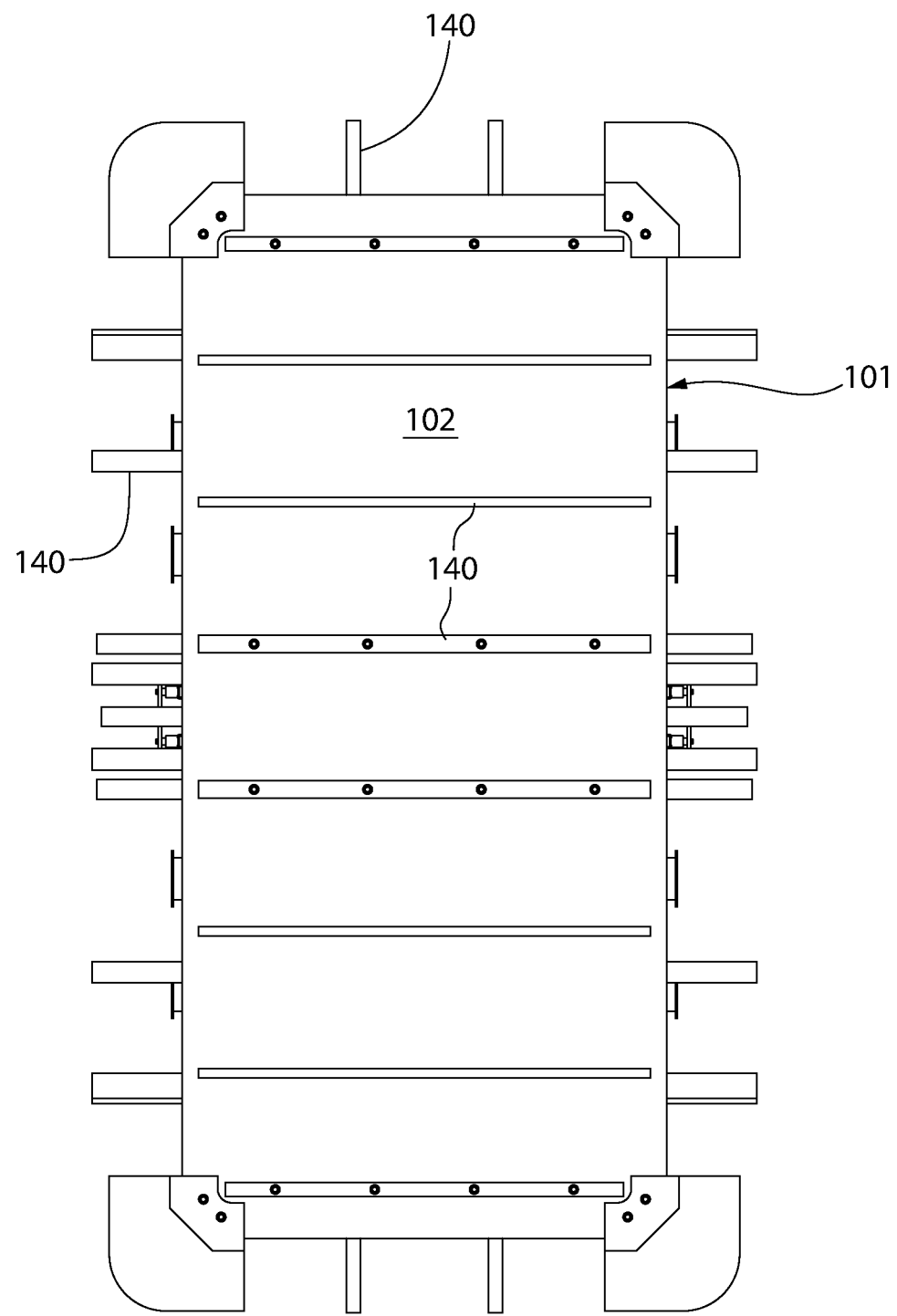
FIG. 9 is a bottom plan view thereof.
Figure 10:
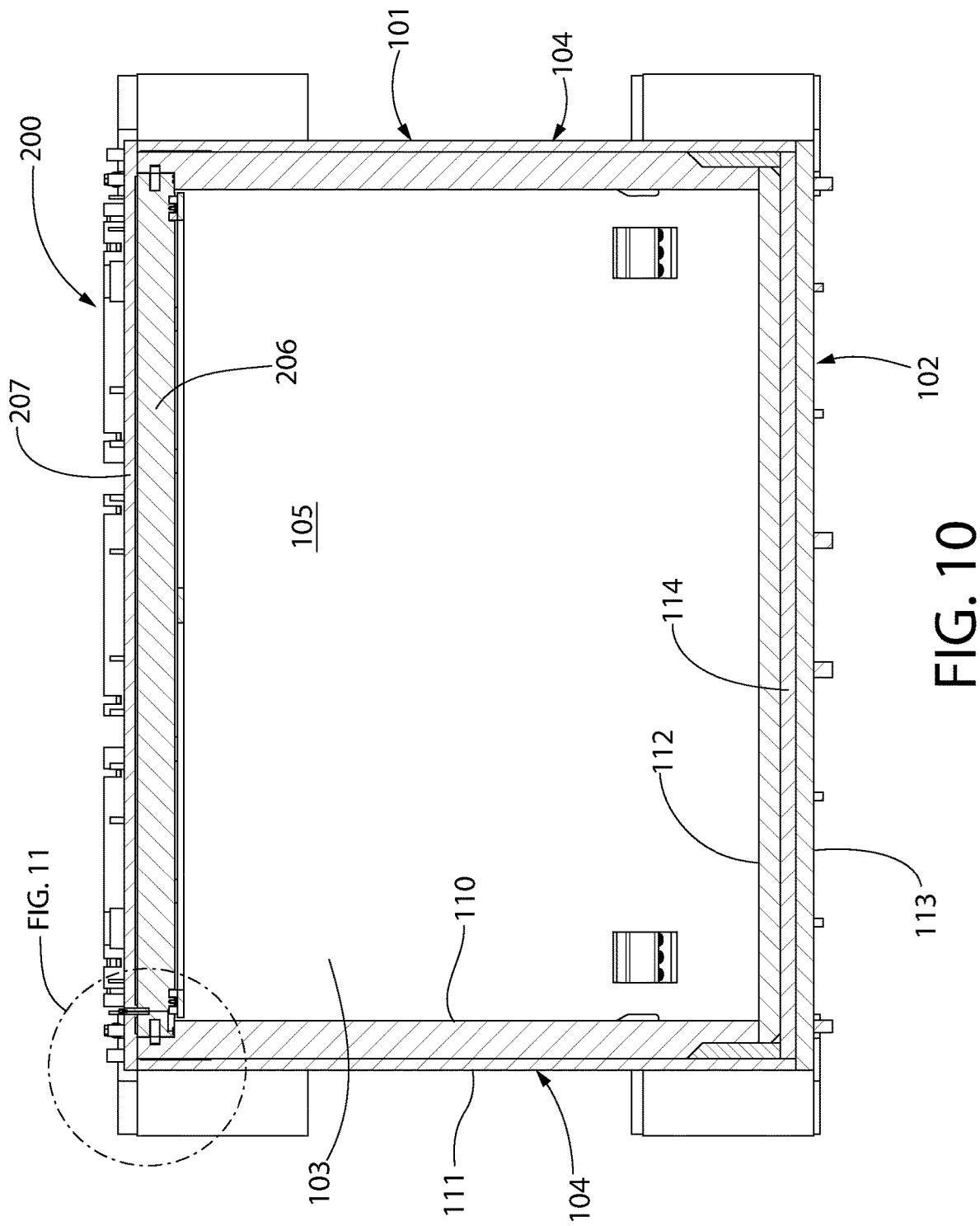
FIG. 10 is a longitudinal transverse cross-sectional view thereof.
Figure 11:
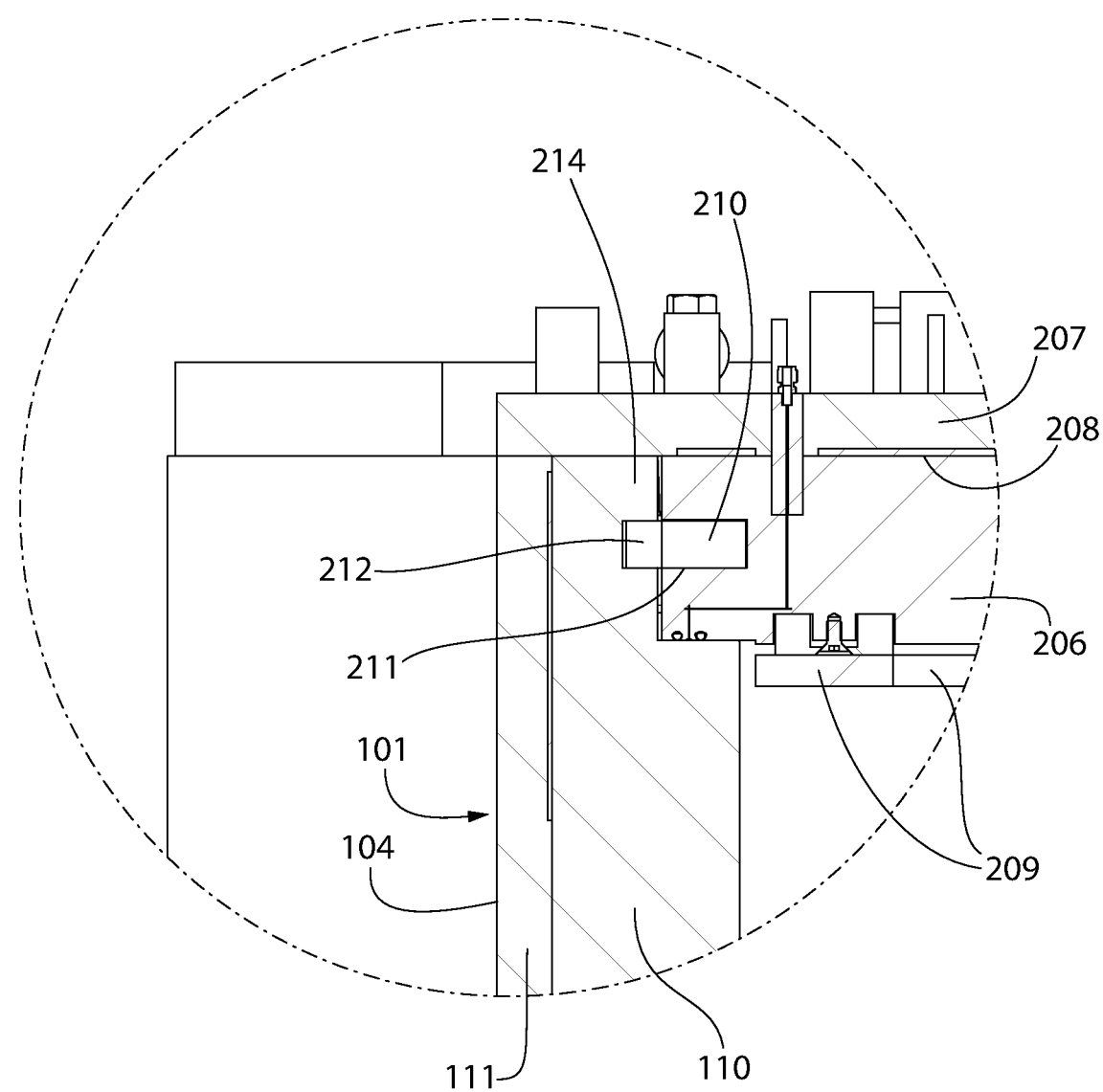
FIG. 11 is an enlarged detail taken from FIG. 10.
Figure 12:
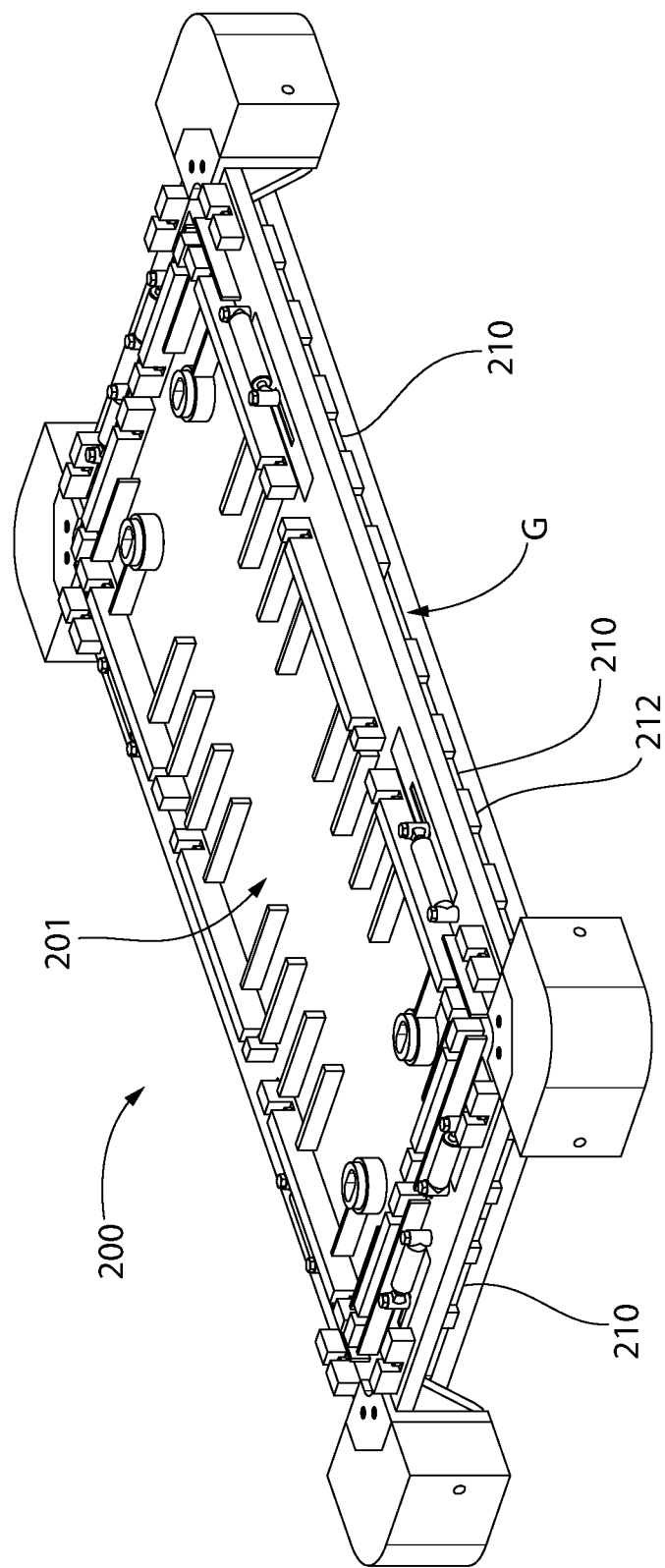
FIG. 12 is a top perspective view of the closure lid.
Figure 13:
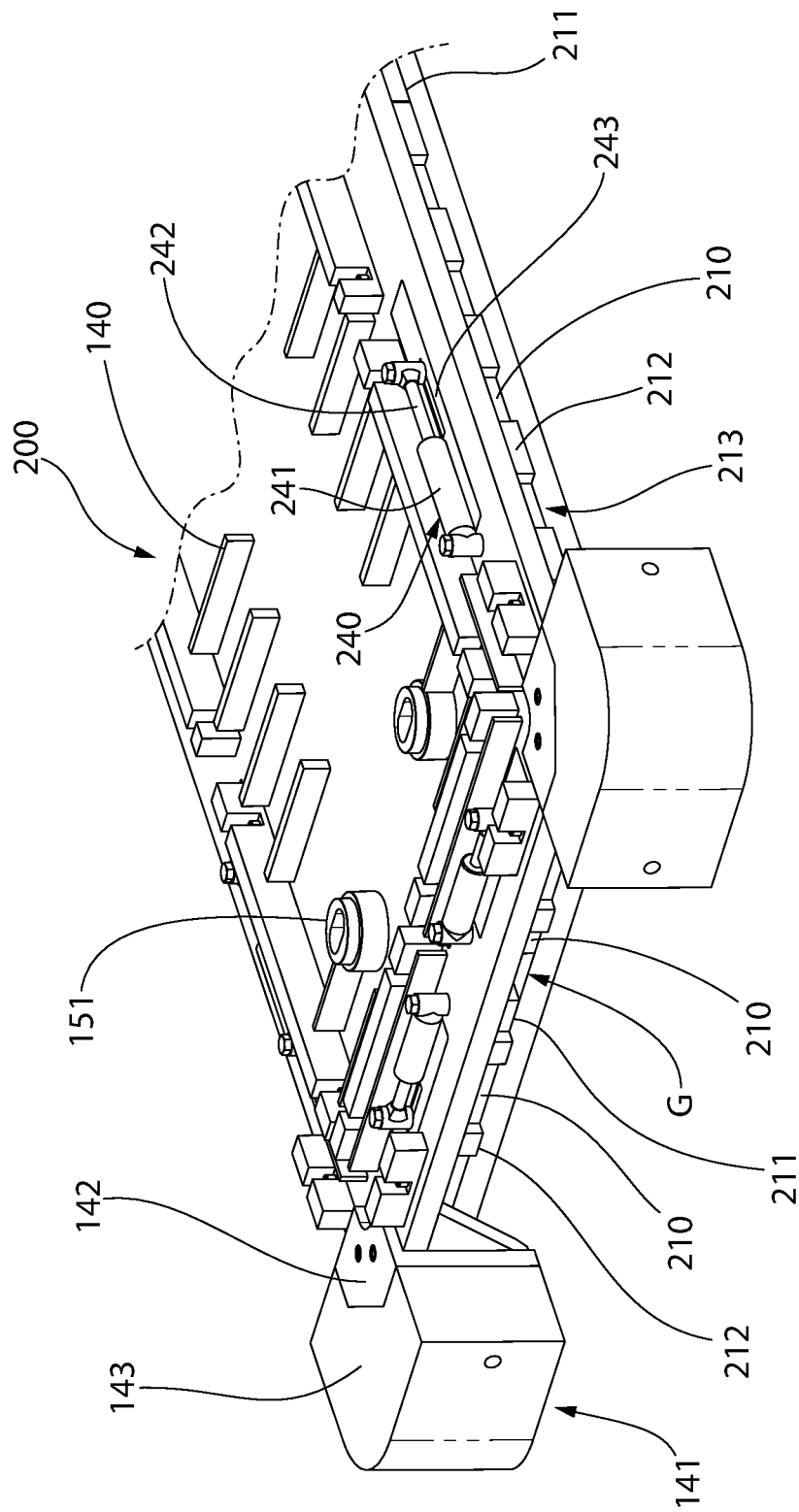
FIG. 13 is an enlarged top perspective view of an end portion of the lid.
Figure 14:
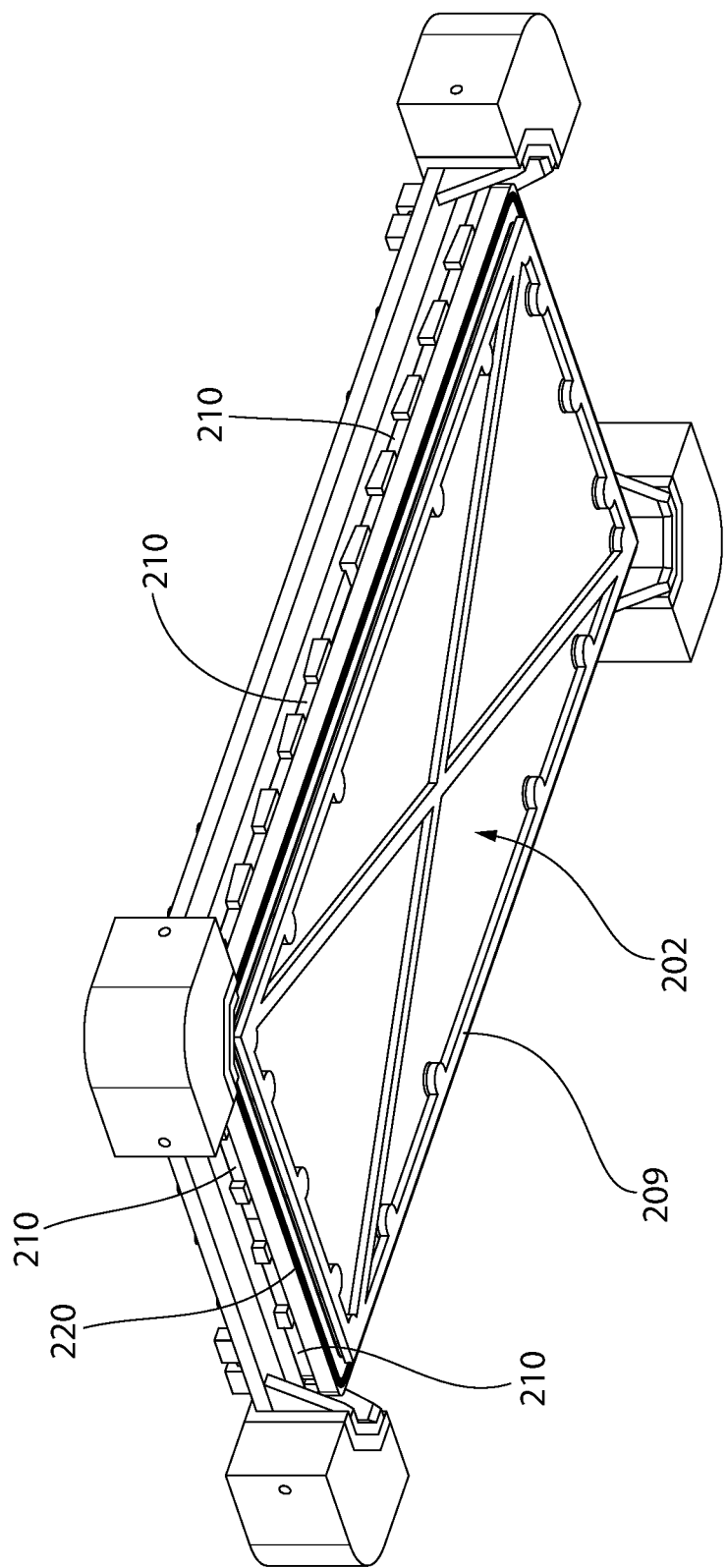
FIG. 14 is a bottom perspective view of the lid.
Figure 15A:
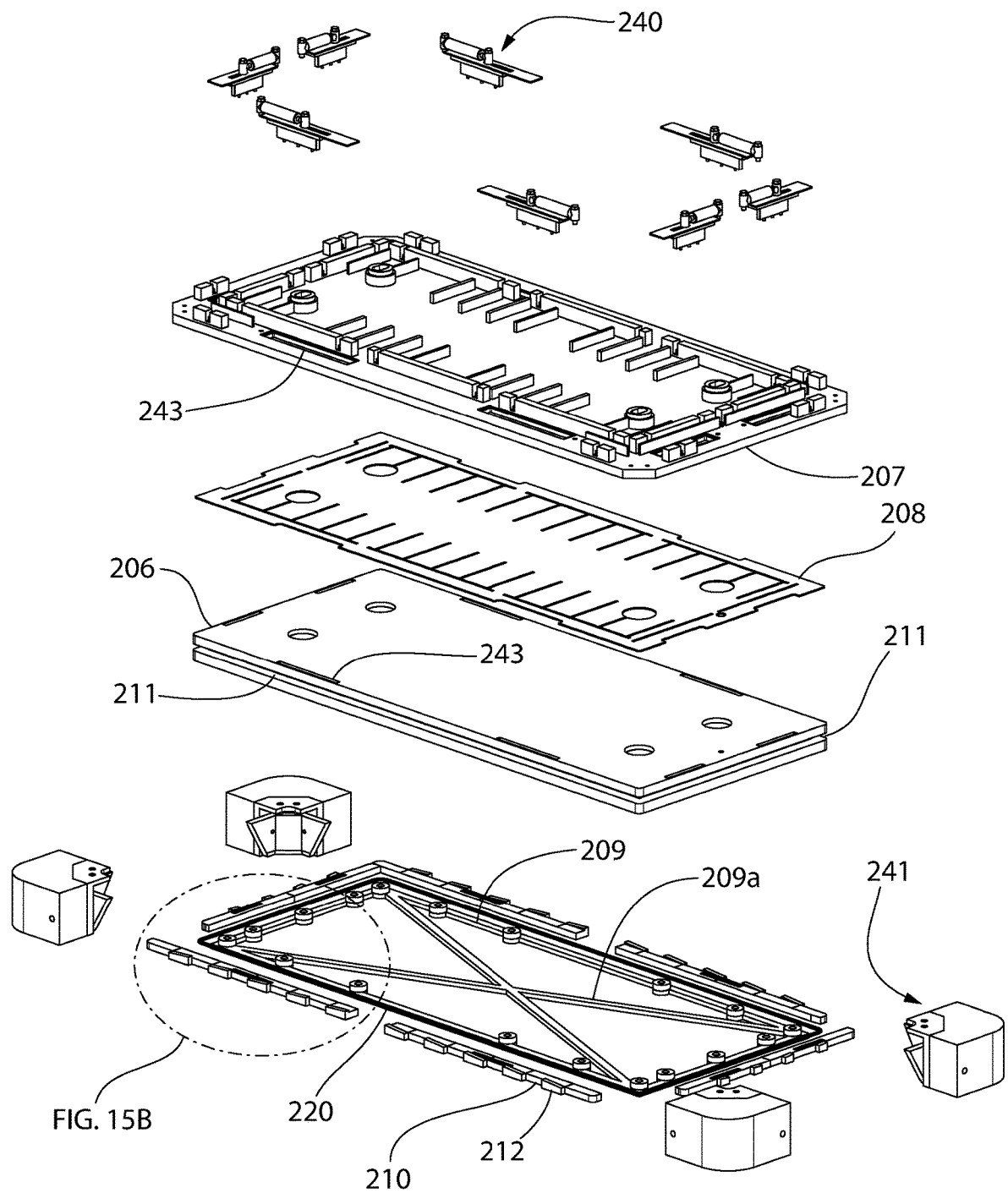
FIG. 15A is a top exploded perspective view of the lid.
Figure 15B:
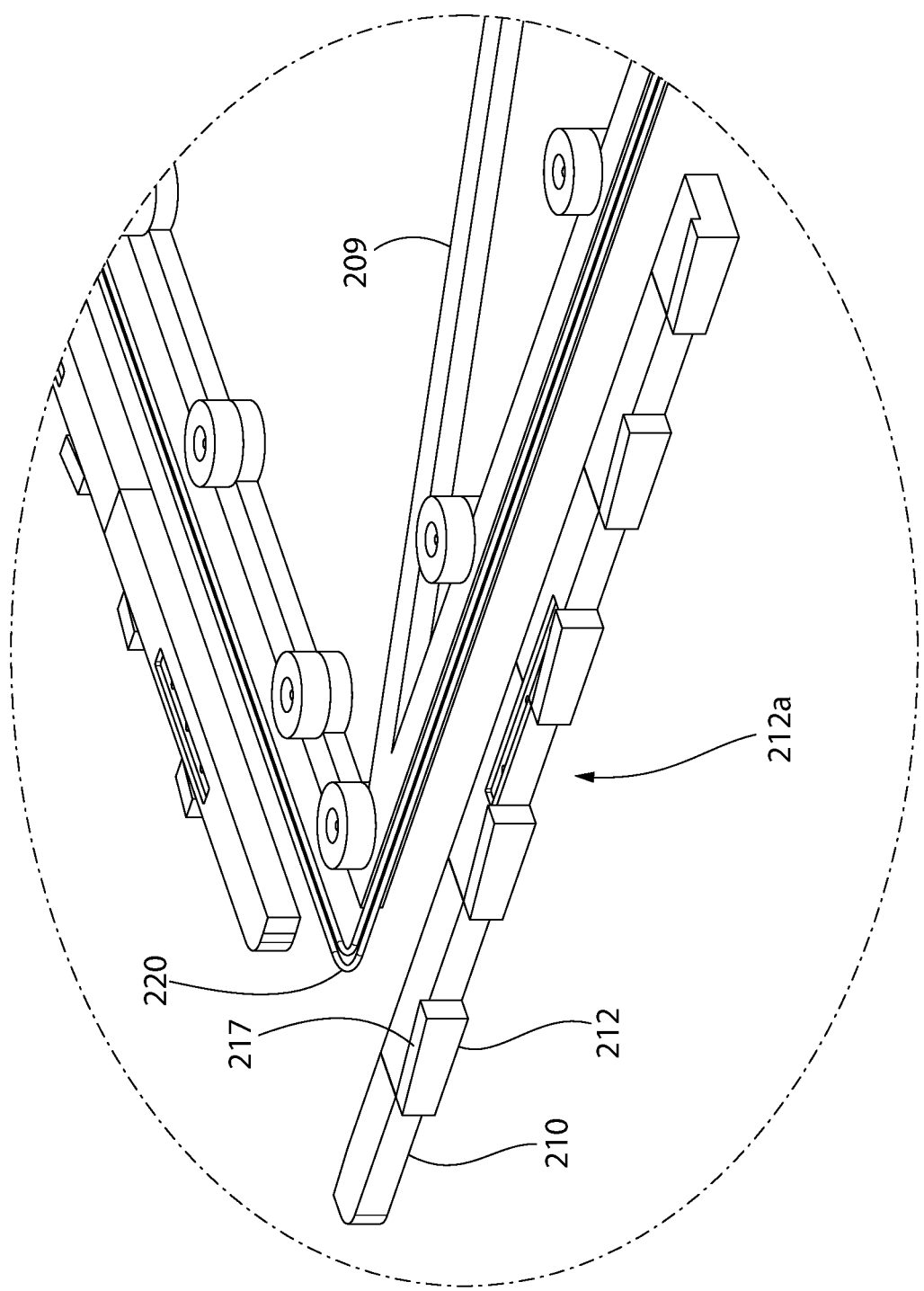
FIG. 15B is an enlarged detail taken from FIG. 15A.
Figure 16:
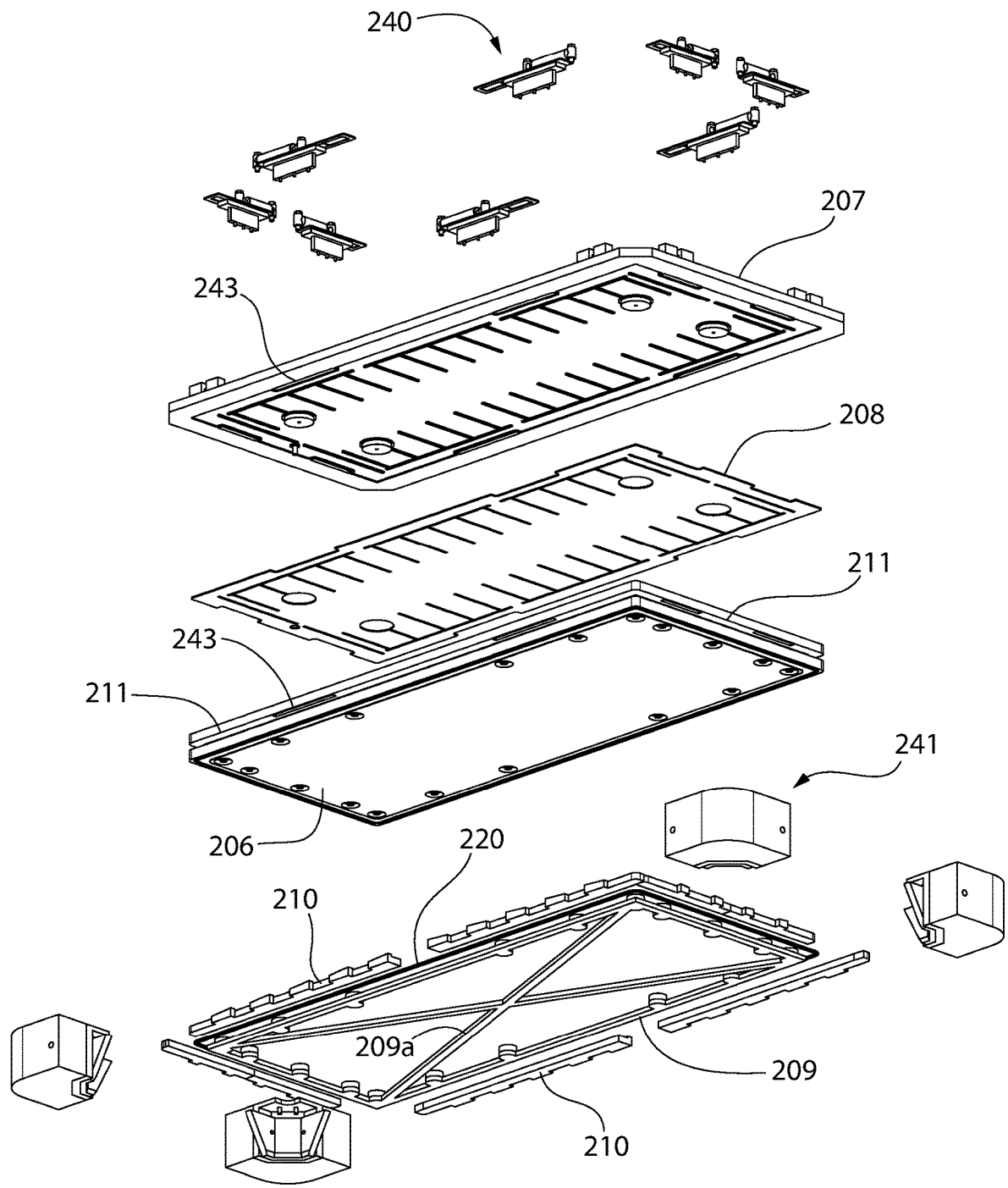
FIG. 16 is a bottom exploded perspective view of the lid.

All drawings are schematic and not necessarily to scale. Features shown numbered in certain figures which may appear un-numbered in other figures are the same features unless noted otherwise herein. A general reference herein to a figure by a whole number which includes related figures sharing the same whole number but with different alphabetical suffixes shall be construed as a reference to all of those figures unless expressly noted otherwise.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

The terms "seal weld or welding" as may be used herein shall be construed according to its conventional meaning in the art to be a continuous weld which forms a gas-tight hermetically sealed joint between the parts joined by the weld. The term "sealed" as may be used herein shall be construed to mean a gas-tight hermetic seal.

FIGS. 1-28 show various aspects of the nuclear waste transport and storage system. The system includes nuclear waste transfer and storage cask 100 (hereafter nuclear waste cask for brevity) which is usable transport and/or store high level nuclear waste materials. Cask 100 comprises an elongated rectilinear-shaped cask body 101 defining a longitudinal axis LA and the lower part of the containment barrier for the nuclear waste. The body 101 may have a rectangular cuboid configuration in one embodiment (as shown) comprising an axially elongated bottom wall 102, a parallel pair of longitudinal sidewalls 103 attached to the bottom wall, and a pair of lateral end walls 104 attached to opposite ends of the bottom wall between the sidewalls. The longitudinal sidewalls are attached to the longitudinal sides or edges of the bottom wall. End walls 104 are oriented transversely and perpendicularly to longitudinal axis LA and longitudinal sidewalls 103, and the longitudinal sidewalls are oriented parallel to the axis to form the box-like structure shown. In one embodiment, the sidewalls and end walls may be welded to each other and in turn to the bottom wall to form a weldment. Four corners 107 are formed at the intersection of the sidewalls 103 and end walls 104 which extend vertically along the height of the cask body 101.

Bottom wall 102 has a flat top surface 102a and parallel opposing flat bottom surface 102b. The bottom wall is configured to be seated on a horizontal support surface such as a concrete pad. The interior and exterior surfaces of each of the longitudinal sidewalls 103 and end walls 104 may be generally flat and parallel to each other as well.

Cask 100 may be used in horizontal position as shown when transporting and storing nuclear waste. In this case, the vertical direction is defined for convenience of reference as being transverse and perpendicular to the longitudinal axis LA. A lateral direction is defined for convenience of reference in the horizontal direction as being transverse and perpendicular to the longitudinal axis.

The bottom wall 102, longitudinal sidewalls 103, and end walls 104 collectively define an internal storage cavity 105 configured for storing nuclear waste materials previously described herein. The bottom wall, longitudinal sidewalls, and end walls define and circumscribe an axially elongated top opening 106 forming an entrance to the cavity for loading nuclear waste materials therein. The longitudinally-extending top opening 106 extends for a substantial majority of the entire length of the cask body (less the thicknesses of the sidewalls and end walls). This provides a large opening which facilitates loading many different shapes and sizes nuclear waste materials into the cask 100.

Longitudinal sidewalls 103 and lateral end walls 104 of the cask may each have a composite construction comprising a metallic inner containment plate 110 adjacent to the storage cavity 105 and a metallic outer radiation dose blocker plate 111 abutted thereto. Bottom wall 102 may similarly have a composite construction comprising a metallic inner containment plate 112 adjacent to the storage cavity and a metallic outer radiation dose blocker plate 113. In some embodiments, as shown, an intermediate dose blocker plate 114 may be sandwiched between the inner containment plate and outer dose blocker plate when needed to provide additional radiation shielding. In some non-limiting embodiments, the containment plates may be formed of steel alloy and the radiation dose blocker plates may be formed of a different steel material such as for example stainless steel for protection against corrosion by the exterior ambient environment. A suitable thickness of the containment and blocker plates may be used as needed to effectively reduce the radiation emitted from the cask to within regulatory compliant exterior levels for containment casks. As noted, the bottom wall and walls of cask 100 may have an all metal construction without use of concrete. However, in other possible embodiments, concrete and additional or other radiation shielding materials including boron-containing materials for neutron attenuation and various combinations thereof may be provided if additional radiation blocking is needed. The bottom wall and wall construction materials used therefore do not limit the invention.

With continuing reference to FIGS. 1-28, cask 100 further includes a longitudinally elongated closure lid 200 which forms the upper containment barrier. Lid 200 may be of rectangular shape in one embodiment to match the rectangular cuboid configuration of the cask body 101 shown. Lid 200 has a length and width sufficient to form a complete closure of the top opening of the cask in order to fully enclose and seal the internal storage cavity 105 of the cask and nuclear waste materials. Lid 200 includes an outward facing top surface 201 and parallel bottom surface 202 facing cavity 105 of the cask body 101 when positioned thereon, parallel longitudinal sides 203 (i.e., long sides of the lid), parallel lateral ends 204 (i.e., short sides of the lid) extending between the longitudinal sides, and corners 205 (four as shown) at the intersection of the longitudinal sides and lateral ends. Top and bottom surfaces 201, 202 are the major surfaces of the lid having a greater surface area than other surfaces on the lid.

Referring additionally to FIGS. 10-17B, closure lid 200 may have a composite construction comprising a metallic inner containment plate 206 at bottom located adjacent to the storage cavity 105 when the lid is position on the cask body 101, and a top metallic outer radiation dose blocker plate 207. Containment plate 206 defines bottom surface 202 of the lid and blocker plate 207 defines top surface 201. An insulation board 208 may be sandwiched between plates 206 and 207 for protection against fire event.

In one embodiment, a peripheral lid spacer frame 209 may be attached to the bottom containment plate 206 of lid 200. Frame 209 has an open space-frame structure which extends perimetrically around the bottom surface 202 of the lid. The frame 209 may include an X-brace 209a extending through the interior space defined by the peripheral linear members of the frame to add structural reinforcement and bracing. When lid 200 is positioned on cask body 101, inner containment plate 206 and frame 209 are received completely into storage cavity 105 of the cask (see, e.g., FIGS. 10 and 11).

A compressible gasket 220 may be disposed on the bottom surface 202 of the lid 200 to form a gas-tight seal at the interface between the lid and cask body. Gasket 220 has a continuous perimetrically extending shape which is complementary configured dimensionally to conform to and circumscribed the top end of the cask body 101 on all sides. Gasket 220 therefore extends perimetrically along the tops of the longitudinal sidewalls 103 and lateral end walls 104 of the cask to form an effective seal. Gasket 220 may be formed of any suitable compressible material, such as elastomeric materials in some embodiments.

According to one aspect of the disclosure, a bolt-free cask locking mechanism provided to lock and seal lid 200 to cask body 101. FIGS. 10-18 and 22-28 in particular show various aspects of the bolt-free cask locking mechanism, which will now be further described in detail.

Lid 200 and cask body 101 include a plurality of locking features which cooperate to form the locking mechanism. The cask locking mechanism may comprise a plurality of first locking protrusions 212 spaced apart on the lid which are selectively and mechanically interlockable with a plurality of second locking protrusions 214 spaced apart on the cask body to lock the lid to the cask body. First locking protrusions 212 are movable relative to the lid and cask body 101, whereas second locking protrusions 214 are fixed in position on and stationary with respect to the cask body.

The locking features of the lid 200 comprises at least one first locking member 212a, which may be in the form of a linearly elongated locking bar 210 for locking the lid to the cask body (see, e.g., FIGS. 15B and 29-32). In one embodiment, a plurality of elongated locking bars 210 are arranged perimetrically around the outer peripheral portions of the lid on longitudinal sides 203 and lateral ends 204. First locking protrusions 212 are formed on and may be an integral unitary structural part of the locking bars in one embodiment being formed of single monolithic piece of cast or forged metal. In other possible less preferred but satisfactory embodiments, locking protrusions 212 may be discrete elements separately attached to the locking bars 210 via mechanical fasteners or welding.

Locking bars 210 are slideably disposed in corresponding outward facing elongated linear guide channels 211 formed in the longitudinal sides and lateral ends of the lid 200. The locking bars are movable back and forth in opposing directions within the guide channels relative to the lid. Each locking bar 210 includes a plurality of the first locking protrusions 212 which project outwardly from the bar beyond the outward facing surfaces of the longitudinal sides 203 and lateral ends 204 of the lid. The linear array of locking protrusions 212 are spaced apart to form openings 213 between adjacent locking protrusions for passing the second locking protrusions 214 on the cask body 101 therethrough, as further described herein.

The longitudinal sides 203 and lateral ends 204 of the lid 200 may each include at least one locking bar 210. In one preferred but non-limiting embodiment, as illustrated, the lateral ends 204 of the lid may include a pair of the locking bars 210 and the longitudinal sides 203 of the lid may similarly include a pair of locking bars. This forms a unique arrangement and interaction between the locking bars to maintain a locked position, as further described herein.

The corresponding locking features of the bolt-free cask locking mechanism on cask body 101 include at least one second locking member 214a comprising the second locking protrusions 214. Locking member 214a may comprise upper portions of cask body 101 in which the second locking protrusions 214 and related features such as locking slot 216 described below are integrally formed with the cask body inside storage cavity 105. Locking protrusions 214 are fixedly disposed in linear arrays on the cask body adjacent to top ends of the longitudinal sidewalls 103 and lateral end walls 104 of the body and cask body top opening 106. The second locking protrusions 214 are therefore stationary and not movable relative to the cask body. The second locking protrusions 214 project inwardly into the nuclear waste storage cavity 105 from the interior surfaces of the longitudinal sidewalls 103 and lateral end walls 104 of the cask body. Second locking protrusions 214 therefore are arranged around the entire perimeter of the cask body to interface with the first locking protrusions 212 of lid 200.

The linear array of second locking protrusions 214 are spaced apart to form openings 215 between adjacent locking protrusions for passing the first locking protrusions 212 on the lid therethrough. A linearly elongated locking slot 216 is formed and recessed into the cask body 101 immediately below the second locking protrusions 214 on each of the longitudinal sidewalls 103 and end walls 104 of the cask body. The locking slots 216 form continuous and uninterrupted inwardly open structures having a length which extends beneath at least all of the second locking protrusions on each of the longitudinal sidewalls 103 and lateral end walls 104 of the cask body as shown. Locking slots 216 therefore extend for a majority of the lengths/widths of the cask body longitudinal sidewalls and end walls. Locking slots 216 are in communication with the openings 215 between the second locking protrusions 214 to form an insertion pathway for the first locking protrusions 212 of lid 200 to enter the locking slots.

In one preferred but non-limiting construction, the openings 215 between the second locking protrusions 214 and the elongated locking slots 216 may be formed as recesses machined into the cask body 101 by removing material from longitudinal sidewalls 103 and lateral end walls 104. The material remaining therefore leaves the second locking protrusions 214 in relief. Second locking protrusions 214 therefore in this case are formed as integral unitary and monolithic parts of the cask body material. In other possible constructions, however, the second locking protrusions 214 may be separate structures which are welded or otherwise fixedly attached to the cask body 101. In this latter possible construction, no locking slot 216 is formed but the cask locking mechanism may nonetheless still function satisfactorily to lock the lid to the cask body. In yet other possible constructions, the second locking protrusions 214 and locking slots 216 may be formed on linearly elongated closure bars of metal having the same composite construction as the longitudinal sidewalls 103 and end walls 104 previously described herein. The closure bars are in turn welded onto the tops of each longitudinal sidewalls and end walls to produce the same structure in the end as illustrated herein.

With continuing reference to FIGS. 10-18 and 22-28, the first and second locking protrusions 212, 214 may be generally block-shaped structures having a rectangular configuration. In one preferred but non-limiting embodiment, the first and second locking protrusions may each be wedge-shaped defining locking wedges having at least one tapered locking surface 217 or 218. The locking protrusions may be configured and arranged such that the tapered locking surfaces 217 of the first locking protrusions 212 on lid 200 are each slideably engageable with one of the tapered locking surfaces 218 of a corresponding second locking protrusion 214 of the cask body 101. In one embodiment, the tapered locking surfaces 217 of the first locking protrusions 212 on lid 200 may be formed on a top surface thereof, and the tapered locking surfaces 218 of the second locking protrusions 214 on cask body 101 may be formed on a bottom surface thereof. When the first and second locking protrusions are engaged to lock the lid to the cask body, the tapered locking surfaces 217, 218 become slideably engaged forming a generally flat-to-flat interface therebetween. This creates a wedging-action which draws the lid 200 towards against the cask body 101 to fully compress the gasket 220 therebetween which forms a gas-tight seal of the cask internal storage cavity 105 and its nuclear waste material content.

The tapered locking surfaces 217 and 218 preferably have the same taper angle A1 (see, e.g., FIG. 29) to form the generally flat-to-flat interface therebetween when mutually and frictionally engaged via the wedging action. Any suitable taper angle A1 may be used. In one representative but non-limiting examples, the taper angle A1 preferably may be between about 2 and 20 degrees. Other tapered angles may be used where appropriate.

The locking bars 210 with first locking protrusions 212 on lid 200 thereon are slideably movable between a locked position or state (see, e.g. FIG. 17A) in which the first and second protrusions 212, 214 are mutually engaged to prevent removal of the lid 200 from the cask body 101 (see, e.g. FIG. 11), and an unlocked position or state (see, e.g. FIG. 17B) in which the first and second protrusions are disengaged to allow removal of the lid from the cask body in a vertical direction transverse to longitudinal axis LA of the cask.

To move the locking bars 210 with sufficient applied force to frictionally interlock the first and second locking protrusions 212, 214, and to concomitantly minimize radiation dosage to operating personnel, a remote lid operating system may be provided. This system is operably coupled to each of the locking bars 210 and configured to advantageously move the locking bars 210 between the locked and unlocked positons from a remote radiation safe distance and area. This obviates the need for operators to manually operate the locking bars directly at the cask during the lid-to-cask body closure and locking process.

Figure 27:
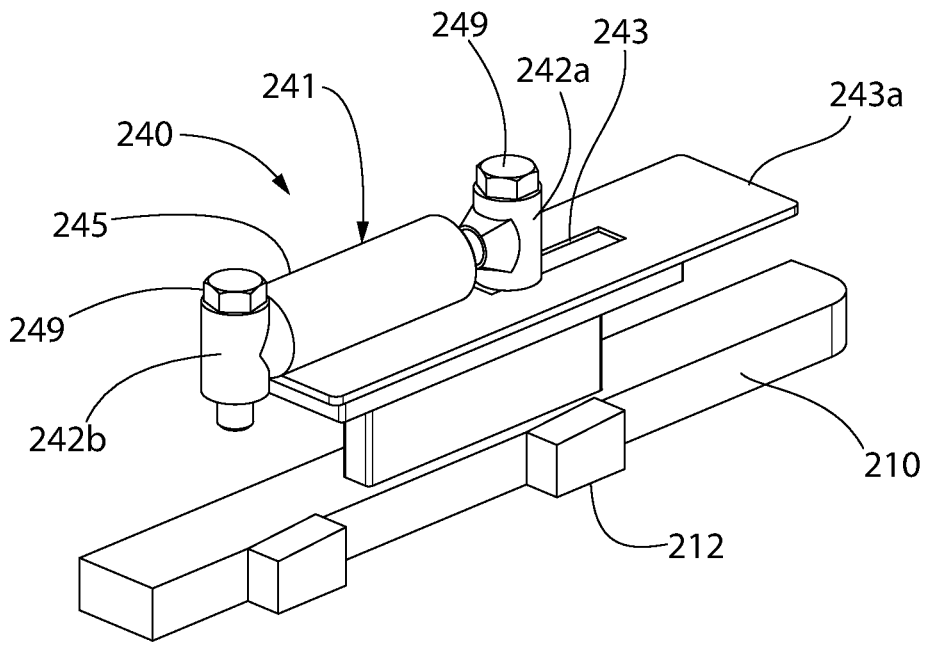
FIG. 27 is a perspective view of an actuator assembly for moving locking bars of the lid.
Figure 28:
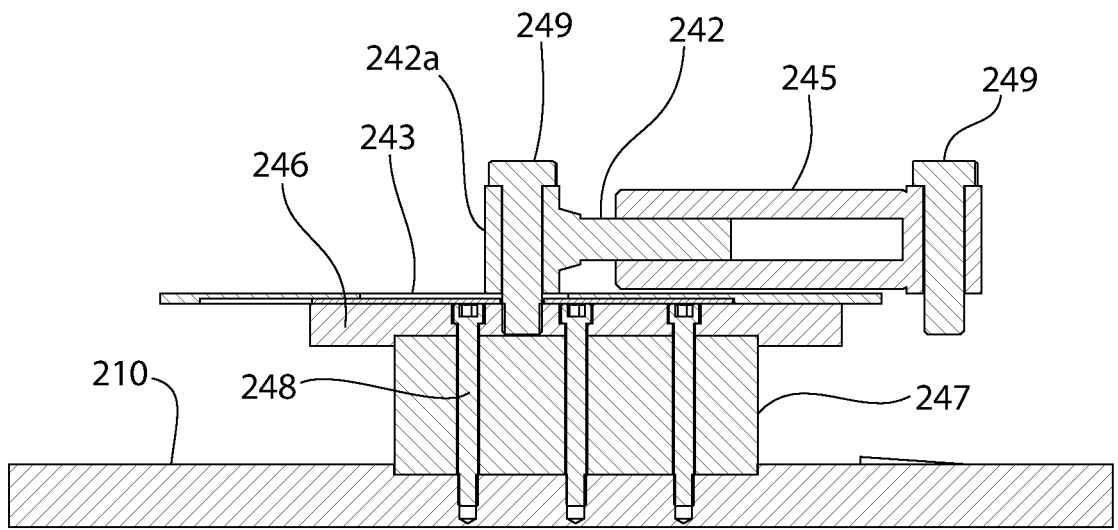
FIG. 28 is a cross sectional view thereof.

In one embodiment, the remotely-operated lid operating system comprises a local actuator 240 mounted on the top surface 201 of lid 200 for and coupled to each of the locking bars 210. FIGS. 27 and 28 show actuators 240 in isolation and detail. Each actuator 240 is an assembly which may generally comprise a cylinder-piston assembly 241 including cylinder 245 and an extendible/retractable piston rod 242 slideably received inside the cylinder. The cylinder-piston assembly is fixedly attached to lid 200. Cylinder 245 may be fixedly mounted to the lid via a bolt 249 passing through a tubular proximal mounting end 242b as shown. Pistol rod 242 has a tubular distal working end 242a fixedly coupled to the locking bar 210 through an elongated operating slot 243 formed through the lid. The piston rod 242 is therefore moves the locking bar 210 in the manner described herein. In one embodiment, slot 243 may be formed in a lid insert plate 243a which in turn is mounted to the lid. A threaded bolt 249 may be used to couple the piston rod to the locking bar 210 via an intermediate block assembly comprising an upper mounting block 246 and lower mounting block 247. Upper block 246 may be formed as integral part of lid insert plate 243a in some embodiments. Piston rod 242 is fixedly bolted to upper mounting block 246. Upper mounting block 246 is fixedly mounted to lower mounting block 247 via a plurality of threaded fasteners 248 which extend through the upper mounting block and are threadably engaged with the locking bar 210 (see, e.g., FIG. 28). The mounting block assembly provides a robust coupling of the piston rods 242 to the locking bars 210 which can withstand the shear forces generated when the cylinder-piston assemblies 241 are actuated to drive the locking protrusions 212, 214 of the lid 200 and cask body 101 into locking engagement.

The cylinder-piston assembly 241 may be either (1) hydraulically operated wherein the working fluid is oil, or (2) pneumatically operated wherein the working fluid is compressed air. Oil or air hoses are fluidly coupled to the cylinder-piston assemblies (not shown) and operated from a remote hydraulic or pneumatic control unit in a conventional manner which comprises an air compressor or hydraulic pump with appropriate valving depending on the type of system provided. When actuated, the locking bar actuators 240 function to slide the locking bars 210 between the locked and unlocked positions (FIGS. 17A and 17B) via extending or retracting the piston rod 242. It bears noting that the use of hydraulic or pneumatic means to move the locking bars 210 applies a greater force to the locking bars to form tight locking engagement via the wedging-action between the first and second locking protrusions of the lid and cask body than could be provided by manually actuating the locking bars 210. This advantage, coupled with avoiding exposure of operating personnel or workers to radiation dosage are notable benefits of the present remote lid operating system.

Interaction between the locking protrusions 212, 214 and a related process/method for locking the nuclear waste cask 100 (i.e., lid 200 to cask body 101) are described farther below. The movement and functioning of the locking bars 210, however, is first further described.

Figure 17A:
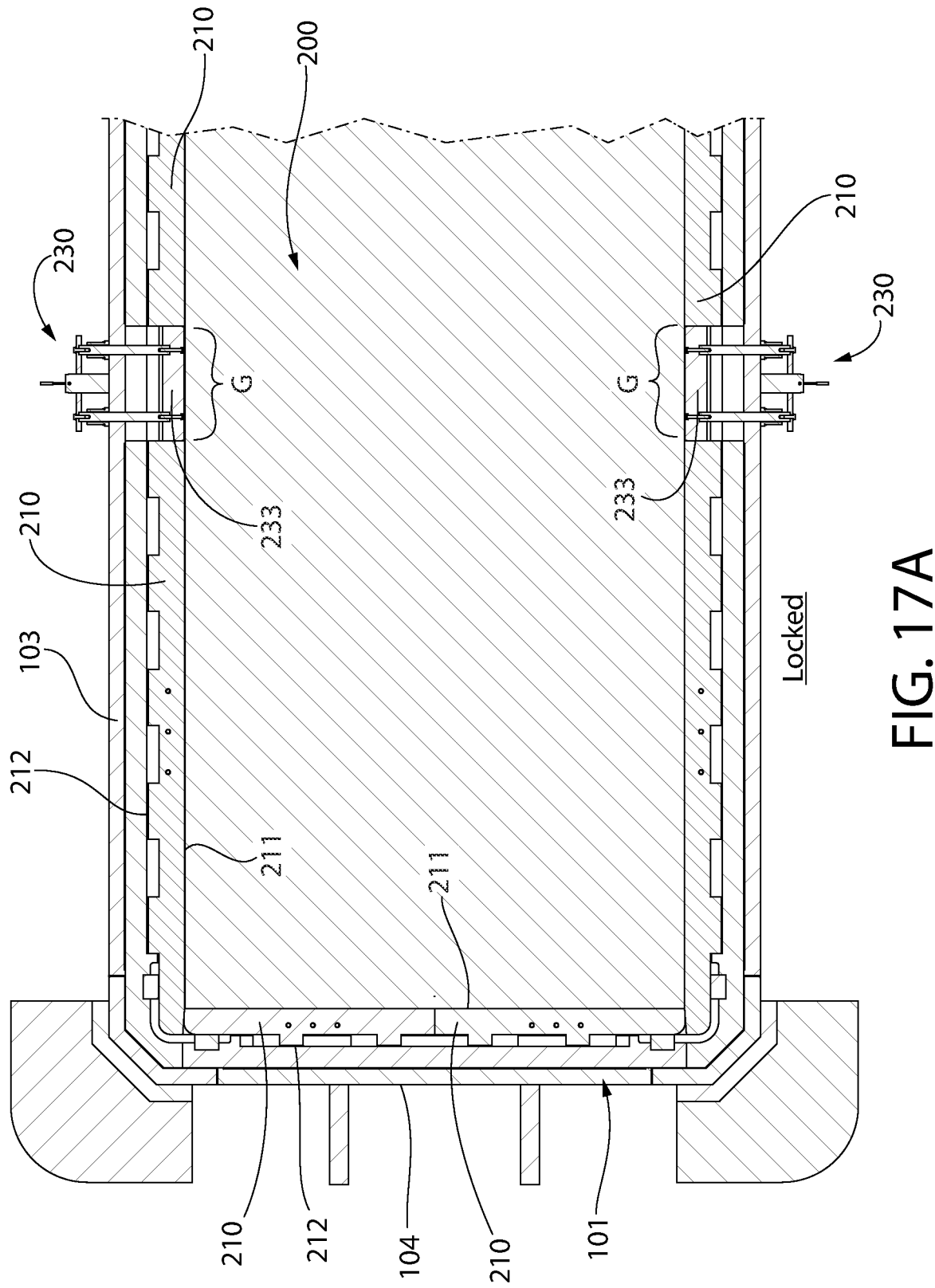
FIG. 17A is a partial longitudinal cross sectional view of the lid showing the cask locking mechanism in a locked position or state.
Figure 17B:
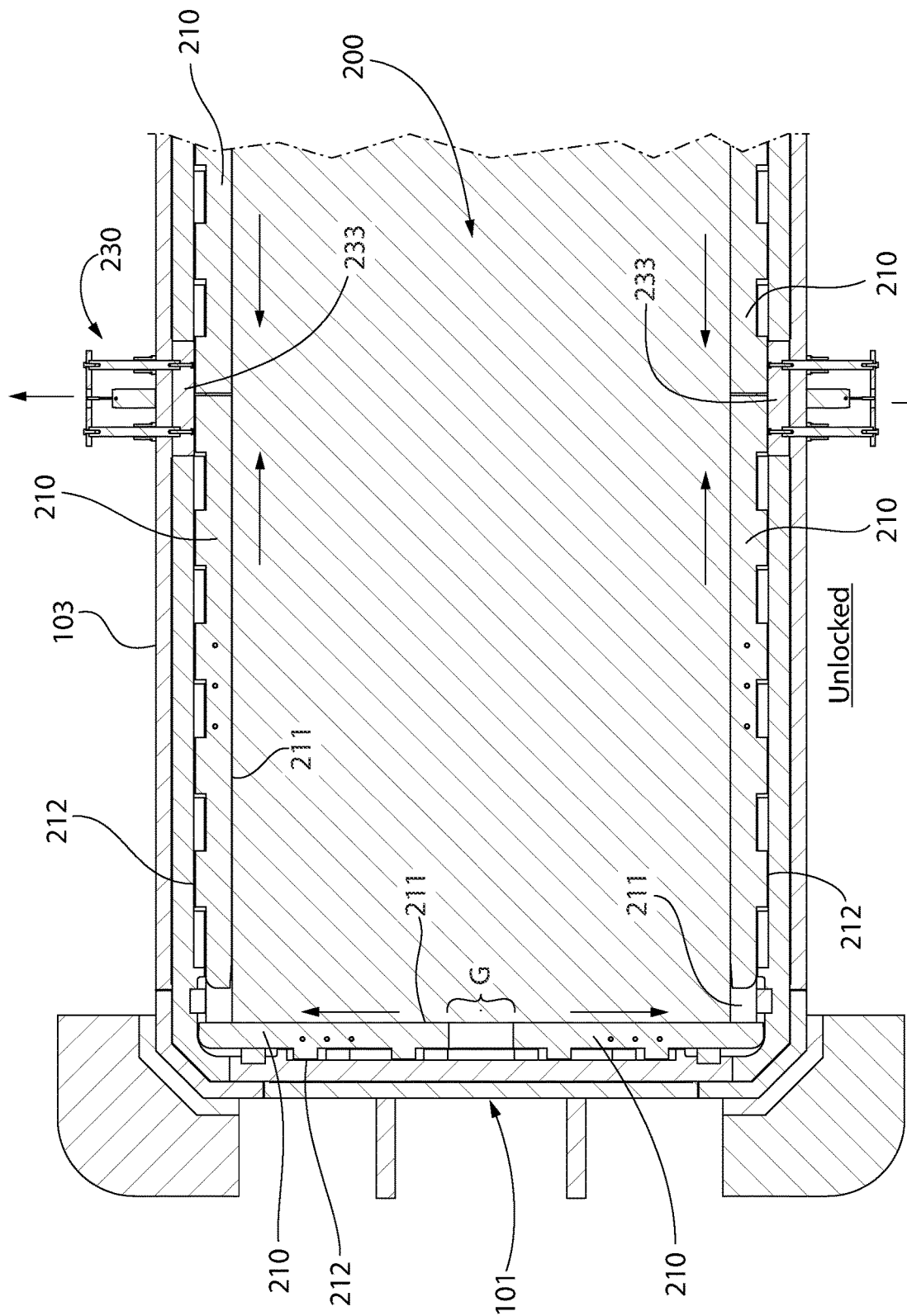
FIG. 17B is a partial longitudinal cross sectional view of the lid showing the cask locking mechanism in an unlocked position or state.
Figure 18:
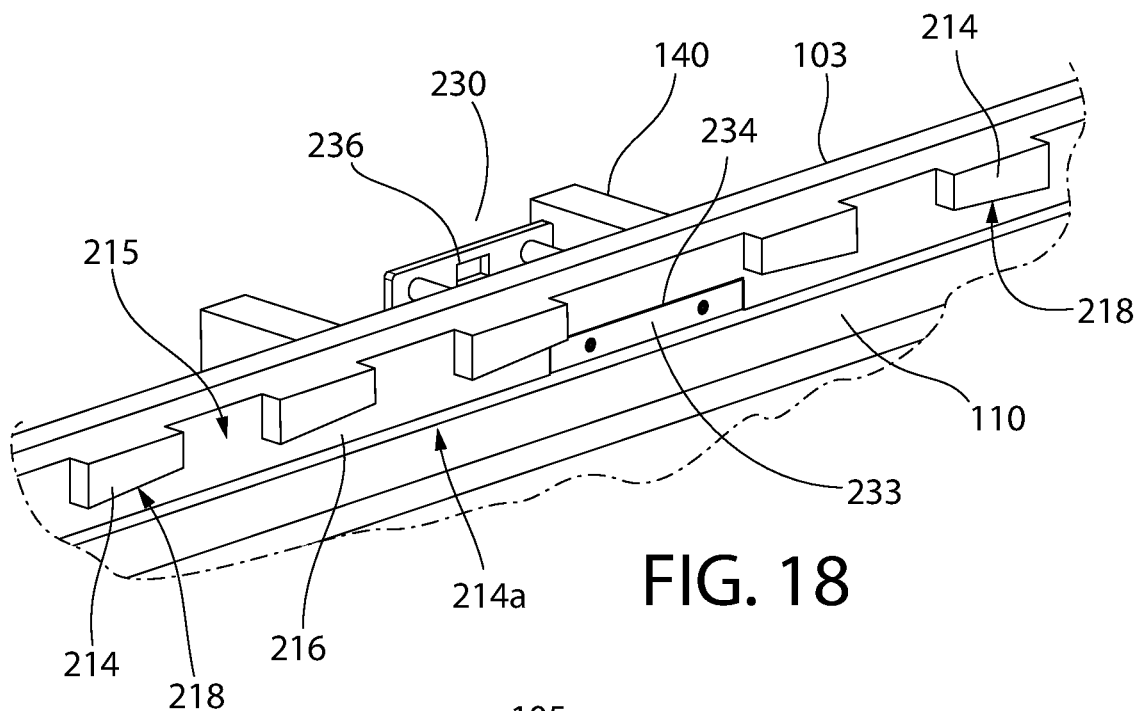
FIG. 18 is an enlarged detail in perspective view of a portion of the cask interior at the top opening showing the cask body locking protrusion arrangement.
Figure 19:
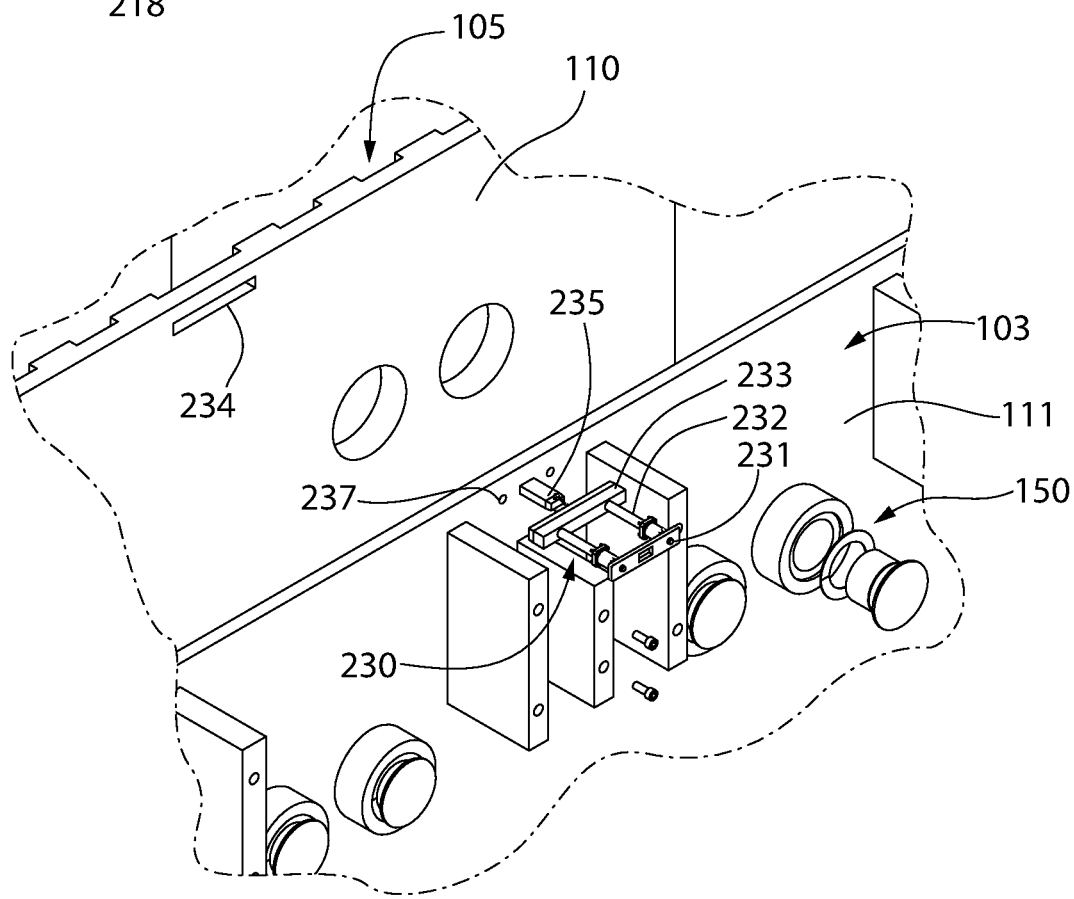
FIG. 19 is an exploded perspective view of a portion of a longitudinal sidewall of the cask body showing a locking handle assembly in exploded view as well.
Figure 20:
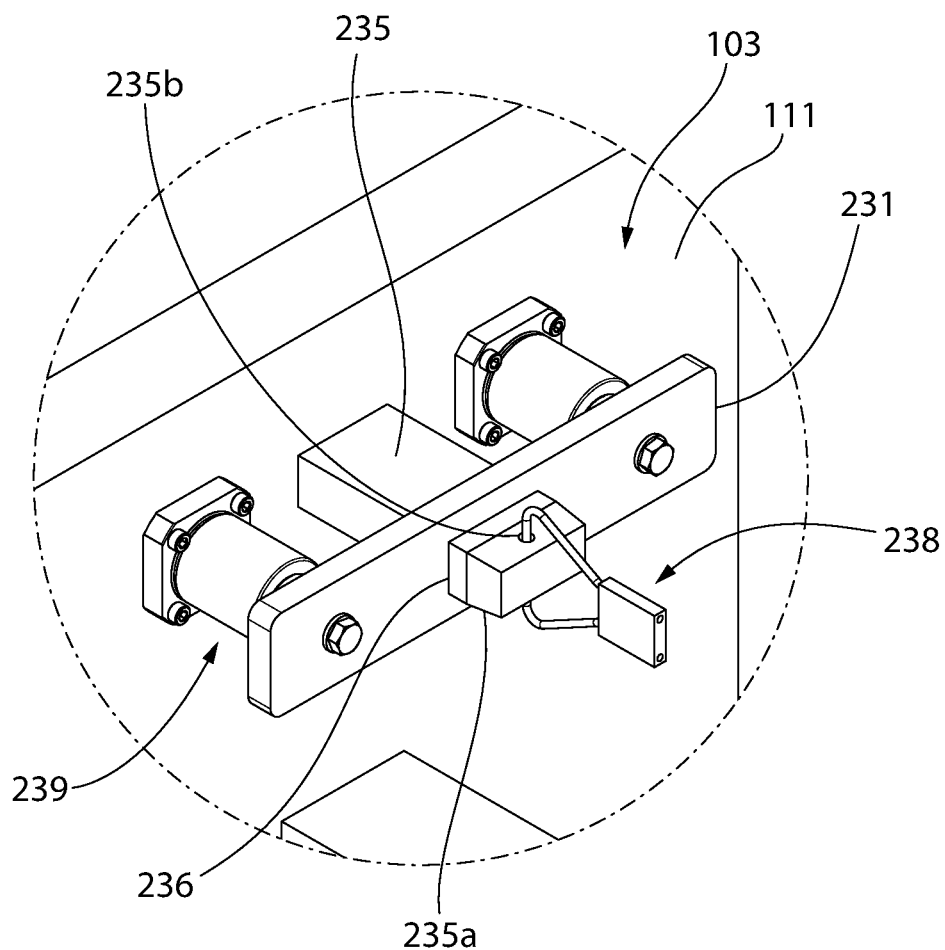
FIG. 20 is an enlarged perspective view of the locking handle assembly in the inward blocking position locked with a cable-lock security tag/seal in place.
Figure 21:
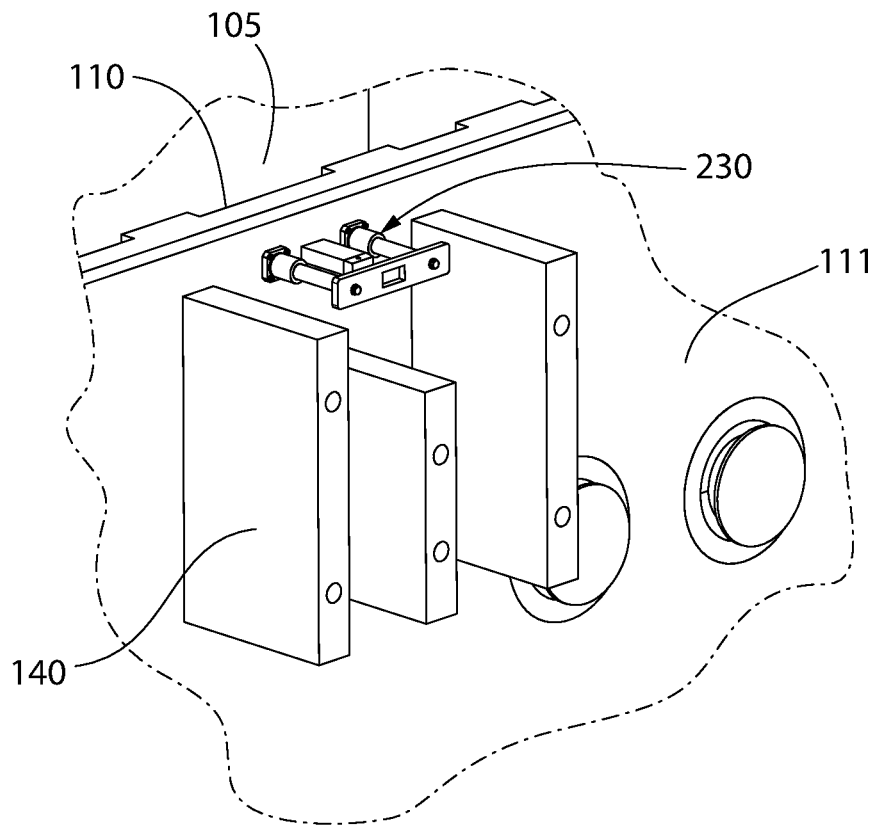
FIG. 21 is a second enlarged perspective view of the locking handle assembly in the outward non-blocking position on the cask body.
Figure 22:
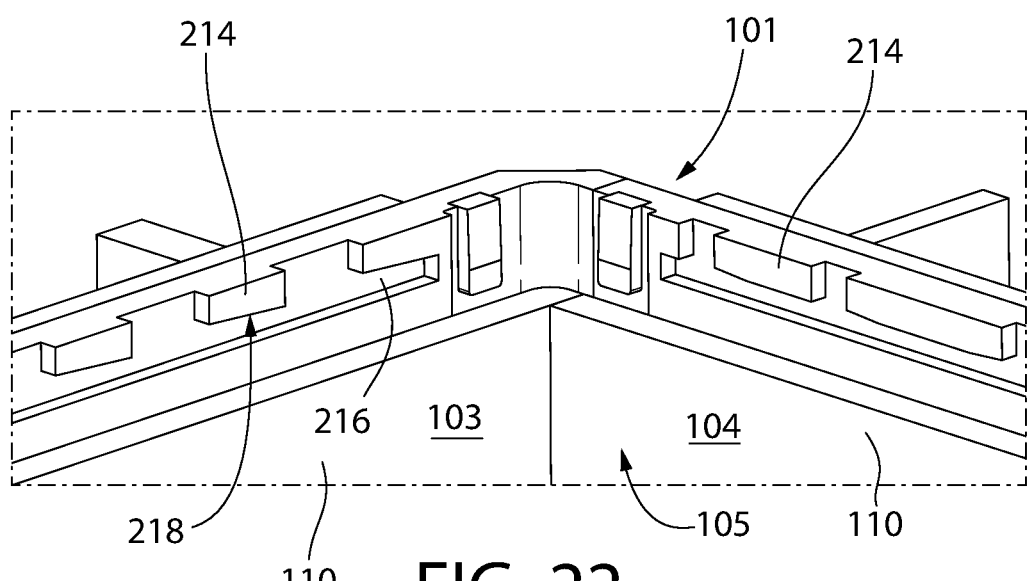
FIG. 22 is an enlarged detail in perspective view of a portion of the cask interior at the top opening in a corner region showing the cask body locking protrusion arrangement on adjoining walls of cask body.
Figure 23:
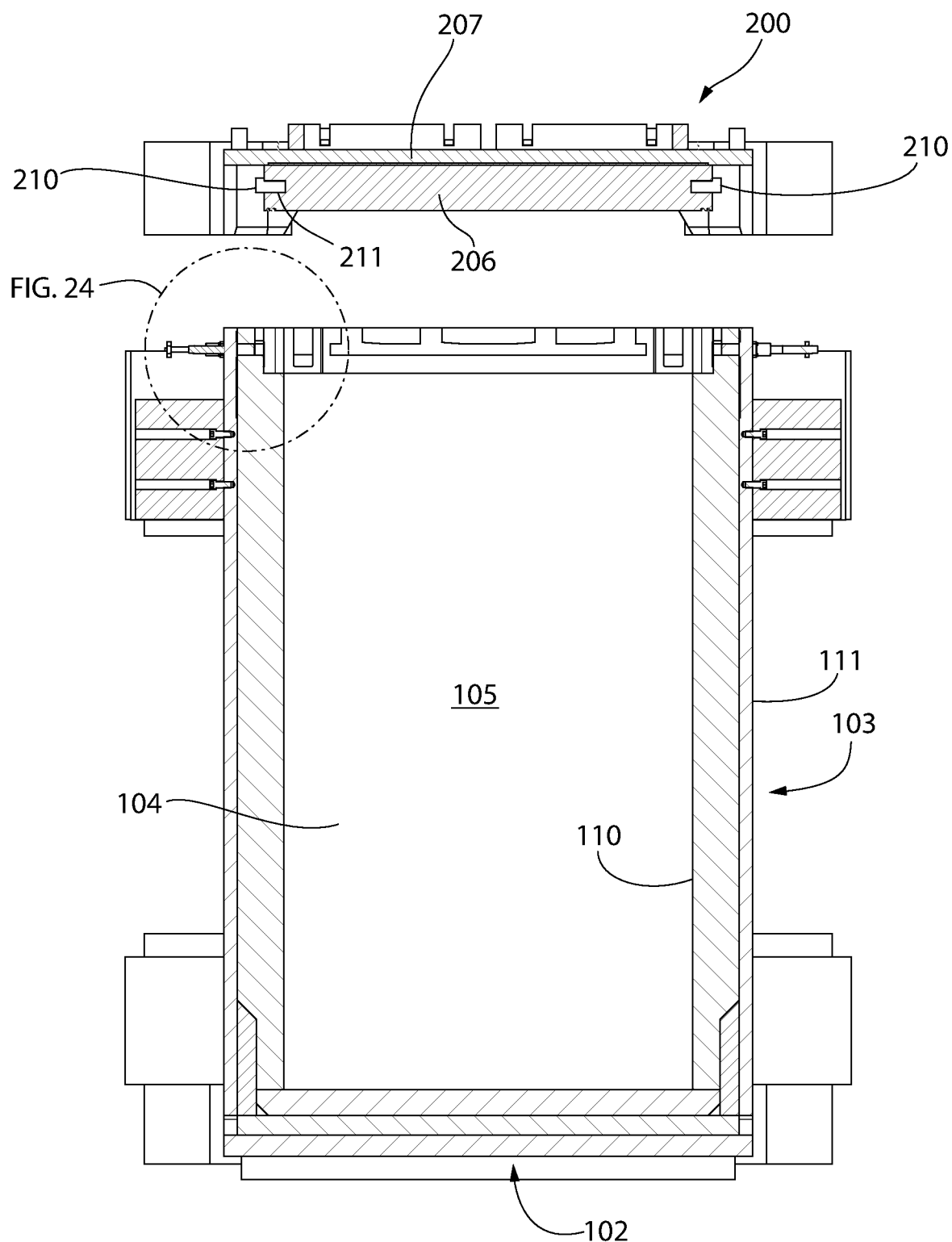
FIG. 23 is a transverse cross sectional view of the cask body and lid showing the lid removed.
Figure 24:
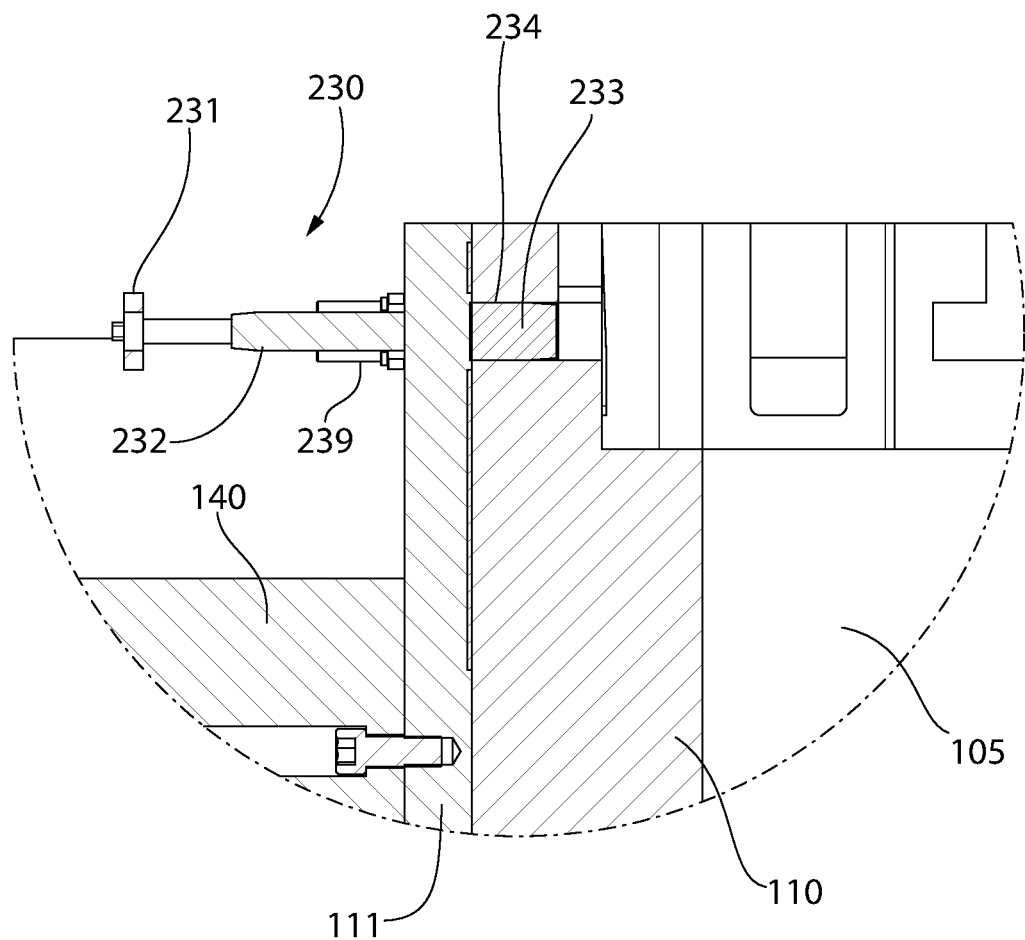
FIG. 24 is an enlarged detail taken from FIG. 23 showing the locking handle assemblies on the longitudinal sidewalls of the cask body in the outward non-blocking position.
Figure 25:
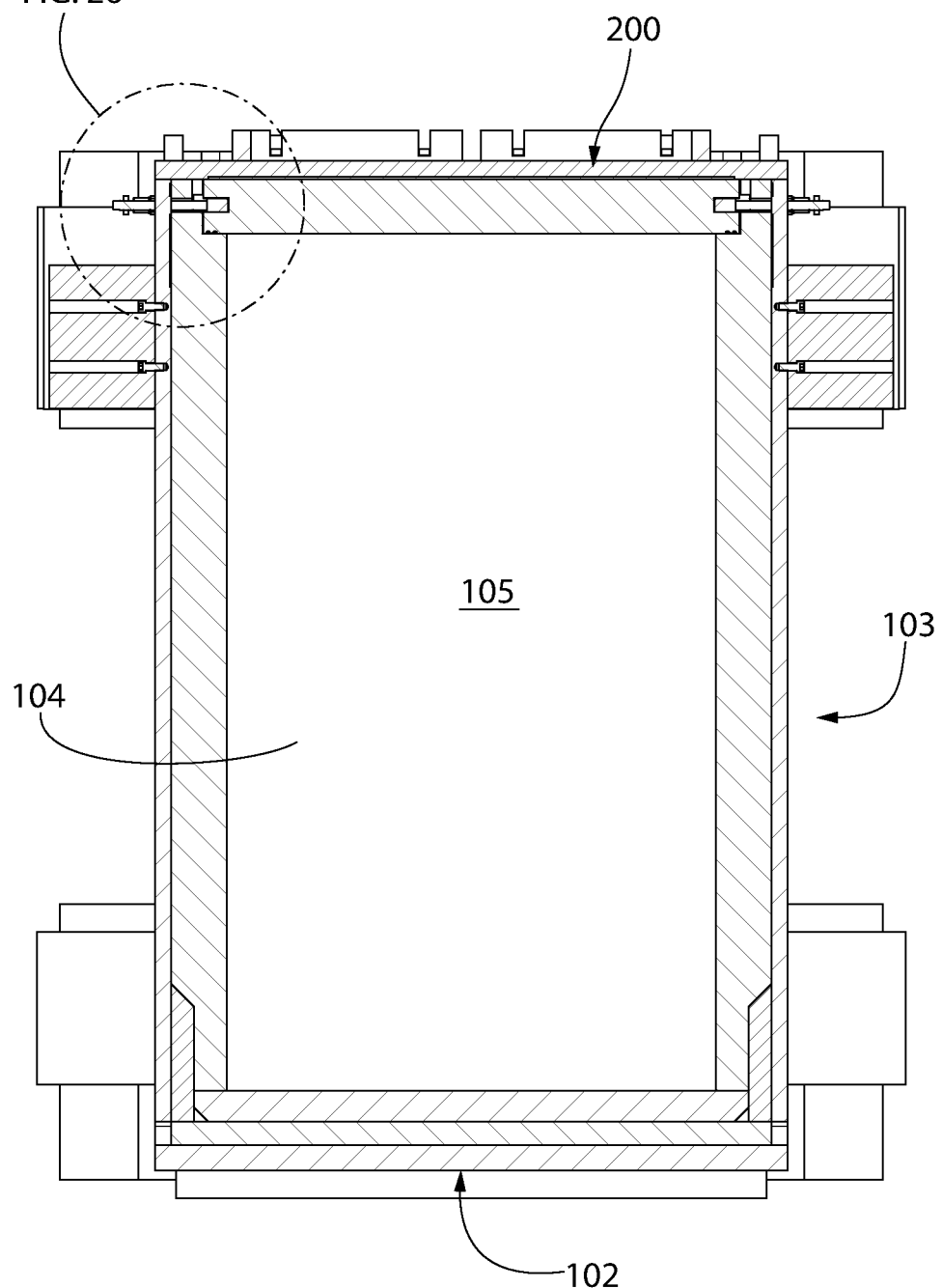
FIG. 25 is a transverse cross sectional view of the cask body and lid showing the lid in position on the cask body.
Figure 26:
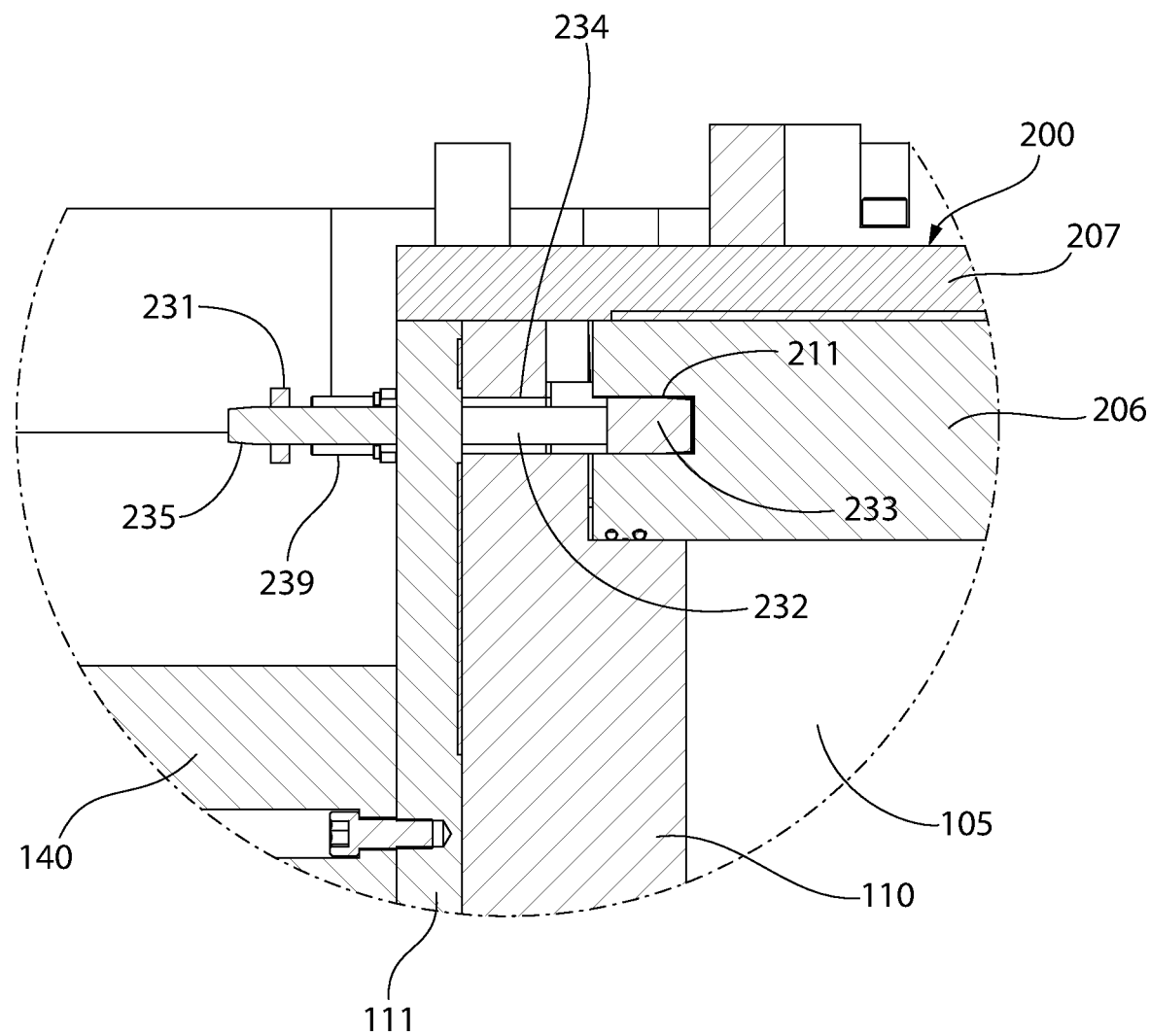
FIG. 26 is an enlarged detail taken from FIG. 25 showing the locking handle assemblies in the inward blocking position.

FIGS. 17A and 17B show the locked and unlocked positions of the locking bars 210 on lid 200. Retention features are provided as a safety mechanism which lock and retain the locking bars in the locked position to prevent the lid 200 from being unintentionally unlocked from the cask body 101, such as could potentially result from substantial force impacts occurring during transporting and handling the cask (e.g., lifting, lowering, or loading the cask onto a transport vehicle/vessel), or during a regulatory postulated cask drop event.

In one embodiment, the locking bars 210 on the longitudinal sides 203 of lid 200 are moveable towards each other to form the unlocked position shown, and away from each other to form the locked position shown. Conversely, the locking bars 210 on the lateral ends 204 of the lid are moveable towards each other to form the locked position, and away from each other to form the unlocked position. This apparent dichotomy serves a purpose. When locking bars 210 on the lateral ends 204 of the lid are therefore positioned and abutted together in the locked position, terminal end portions 210a of the locking bars on the longitudinal sides 203 of the lid are positioned to overlap and engage/block the locking bars on the lateral ends 204 of the lid from being moved apart to the unlocked position (see, e.g., FIG. 17A). This forms a first locking bar retention feature which locks the lid lateral end locking bars 210 in the locked position.

The second locking bar retention feature acts on the locking bars 210 on the longitudinal sides 203 of the lid 200 to lock the lid longitudinal side locking bars in the locked position. This retention feature comprises a locking handle assembly 230 slideably mounted on each of the longitudinal sidewalls 103 of the cask body 101 (see, e.g., FIGS. 17A-B, 19-21, and 23-26). Each locking handle assembly 230 includes an elongated proximal handle 231 configured for receiving an applied force generated by a user such as via grasping or a tool, a distal elongated locking block 233, and a securement bar 235. The locking block 233 is coupled to the handle 231 by one or more elongated coupling rods 232 of any suitable polygonal or non-polygonal cross-sectional shape. Preferably a pair of coupling rods 232 are provided. Securement bar 235 is fixedly attached to the exterior surface of the cask body longitudinal sidewalls 103 (e.g., welded) and has a proximal end 235a which is insertable through an aperture 236 in the handle 231. End 235a may project through aperture 236 when the handle assembly is fully inward and can be secured in place (e.g., FIG. 20 further described herein).

The locking handle assemblies 230 are positioned on each longitudinal sidewall 103 of the cask body 101 to allow the locking block 233 to be manually and selectively moved into and out of the locking slots 216 on the cask body sidewalls. A windows 234 formed in each longitudinal sidewall 103 allows the locking block 233 to access the guide channels 216. More particularly, window 234 is formed in and extends completely through inner containment plate 110 of the longitudinal sidewalls 103 of the cask body. Locking block 233 is completely retractable from locking slot 216 into the containment plate 110 to allow insertion of first locking protrusions 212 on locking bars 210 into and slideably moved along the locking slot 216 beneath second locking protrusions 214 of the cask body. The outer radiation dose blocker plate 111 comprises a pair of holes 237 to permit the two coupling rods 232 to be coupled to locking block 233 located inside the blocker plate in window 234 of the inner containment plate 110 (see, e.g., FIG. 18). A pair of cylindrical mounting flange units 239 may be used to fixedly mount each locking handle assembly 230 to the dose blocker plate 111 on the longitudinal sidewalls 103 of cask body 101 (see, e.g., FIG. 20). Flange units 239 may be bolted/screwed or welded to the outer blocker plate 111. The flange units 239 further act as standoffs to limit the maximum inward projection of the locking block 233 into the locking slot 216 of the cask body. The coupling rods 232 are slideably inward/outward through the flange units to change position of the locking handle assemblies 230.

The locking handle assemblies 230 are moveable via handles 231 between (1) an inward blocking position in which the locking blocks 233 project into the locking slots 216 of the cask body 101 beneath the second locking protrusions 214, and (2) an outward non-blocking position in which the locking blocks 233 are completely retracted from the locking slots. The non-blocking position allows locking bars 210 with first locking protrusions 212 thereon to enter and slide back and forth in the locking slots 216 between the locked and unlocked positions (both previously described herein) when the lid 200 is positioned on cask body 101. Once the locking bars are in the locked position, a gap G is formed between each pair of locking bars on the longitudinal sides 203 of the lid (see, e.g., FIGS. 12 and 17A). Moving the locking handle assemblies 230 to the inward blocking position locates the locking blocks 233 in and fills the gaps G on each longitudinal sidewall 103 of the cask body (within guide channels 211 of lid 200). The locking bars 210 therefore cannot be drawn back together to their unlocked position, thereby locking the locking bars in the locked position due to interference between the locking blocks 233 and locking bars. To move the locking bars 210 on longitudinal sidewalls 103 to the unlocked position, the locking blocks 233 are first withdrawn via handles 231 of the locking handle assemblies 230 to re-open gap G, thereby allowing the longitudinal sidewall locking bars to slide together again to the unlocked position.

When each handle assembly 230 is in the inward blocking position, the securement end 235a of securement bar 235 is projected through apertures 236 in handles 231. Any suitable commercially-available cable-lock security tag or seal tag 238 as shown may be coupled through hole 235b in securement bar 235 to lock the handle assemblies in the inward blocking position. Should the cask 100 be impacted or dropped during handled, the lid 200 will remain locked to the cask body 101 since the handle assemblies 230 cannot be moved outward to unlock the lid. The security tag also provides visual indication that the lid is in the locked position to operating personnel. This is especially helpful in situations where the cask lid 200 may be loaded with radioactive materials and locked to the cask body 101 at one location, and then the cask is transported to a more remote receiving location. The crew at the receiving location can readily confirm the lid is in the locked position or state.

A process or method for locking the nuclear waste storage cask 100 using the foregoing features will now be briefly described. FIGS. 29-32 are sequential views showing the relationship between the first and second locking protrusions 212, 214 during the lid mounting and cask locking process.

The process or method generally includes first placing the locking bars 210 on longitudinal sidewalls 103 and lateral end walls 104 of lid 200 in their unlocked position and the locking blocks 233 on locking handle assemblies 230 in their non-blocking positions which retracts the locking blocks 233 from the locking slots 216 on the longitudinal sidewalls 103 of the cask body 101 (FIG. 17B). The locking bar actuators 240 or manual means may be used to perform the foregoing step. The locking bars 210 on longitudinal sides 203 of lid 200 are together, and locking bars on lateral ends 204 of the lid are spaced apart forming gap G therebetween as shown. The lid is positioned over and align with the cask body 101 wherein the lid first locking protrusions 212 are vertically aligned with the openings 215 between second locking protrusions 214 on the cask body (FIG. 29).

Next, the closure lid 200 is lowered and positioned on top of the cask body 101 over the top opening 106. This step first vertically inserts the peripheral array of first locking protrusions 212 on locking bars 201 of lid 200 between the peripheral array of second locking protrusions 214 disposed on the cask body 101 around the top opening (FIG. 30). As the lid engages the top of the cask body 101, the first locking protrusions pass completely through the openings 215 between the second locking protrusions 214 and enter the horizontally elongated locking slots 216 in a position below the second locking protrusions (FIG. 31). In turn, the second locking protrusions 214 pass through openings 213 between the first locking protrusions 212 and become positioned above the first locking protrusions.

The process or method continues with then sliding the locking bars 210 to their locked positions (FIGS. 17A and 31), which moves the first locking protrusions 212 beneath the second locking protrusions 214 in a horizontal locking plane oriented parallel to the bottom wall 102 and passing through the locking slots 216. This step may be performed by actuating the hydraulic or pneumatic cylinder-piston assembles 241 of the locking bar actuators 240 from a location remote from the cask to minimize radiation exposure of operating personnel. Sliding the locking bars 210 slideably and frictionally engages the first locking protrusions 212 of the lid with bottom surfaces of the second locking protrusions 214 of the cask body 101. Specifically, the tapered locking surfaces 217, 218 of the wedge-shaped locking protrusions 212, 214 become mutually locked in increasingly tightening frictional engagement via the wedging-action produced. This draws lid 200 downward with added force beyond the weight of the lid alone onto and against the cask body 101 to fully compress gasket 220 and seal the cask cavity 105. The gasket is now compressed further than when the lid 200 first engages the cask body before the cask locking mechanism is actuated to draw the lid farther downward.

Now that the lid 200 is fully coupled to the cask body 101, the locking handle assemblies 230 may be moved to their inward blocking positions to insert the locking blocks 233 between each pair of locking bars 210 on the longitudinal sides 103 of the lid, thereby preventing sliding and unlocking of the longitudinal side locking bars (FIG. 17A). The handle assemblies therefore retain the locked positions of the locking bars on the cask longitudinal sidewalls 103, which in turn retains the locking bars on the cask end walls in the locked position as previously described herein.

It bears noting that although the locking bars 210 with locking protrusions 212 are shown and described herein as being slideably mounted to the lid 200 and locking protrusions 214 are shown and described as being fixedly mounted to the cask body 101 in one embodiment, in other embodiment the arrangement may be reversed. Accordingly, the locking bars 210 may be slideably mounted to guide channels 211 formed in the cask body while the fixed locking protrusions 214 may instead be fixedly mounted to the closure lid. This alternate arrangement provides the same benefits and is operated in the same manner previously described herein. The locking bar hydraulic or pneumatic actuators 240 in turn would be mounted to the cask body for operating the locking bars 210.

Although the cask locking mechanism with locking bars 210 and locking protrusions 212, 214 are shown and described herein as being applied to a box-shaped rectangular cuboid cask body and rectangular lid, the locking mechanism may be applied with equal benefit to a conventional cylindrical cask body and circular lid. The fixed second locking protrusions 214 may be arranged on either the cylindrical cask body or lid, and the locking bars 210 may be mounted on the other one of the cask body or lid. The locking bars and guide channels for the cylindrical cask application may be arcuately curved and operated via the hydraulic or pneumatic locking bar actuators 240 previously described herein if mounted on either the cask body or circular lid. Alternatively, both the locking protrusions 212, 214 may be fixedly mounted to the cylindrical cask body and lid, and the slideable locking bars may be omitted. In this case, the lid may simply be rotated relative to the cylindrical cask body to slideably and frictionally engage the wedge-shaped locking protrusions to form a breech lock type closure. The lid may be rotated via assistance form the hydraulic/pneumatic actuators. Based on the foregoing alternative embodiments of the cask locking mechanism and description already provided herein, it is well within the ambit of those skilled in the art to implement any of these options without undue experimentation.

With general reference to FIGS. 1-10 and 21-23, an impact absorption system is provided to protect the cask 100 and containment barrier from undue damage should the cask be forcibly impacted or dropped during transport and handling. In one embodiment, each of the longitudinal sidewalls 103 and lateral end walls 104 of the cask body 101 comprises a plurality of outwardly protruding impact absorber bars 140 fixedly coupled thereto. The closure lid 200 and bottom surface 102 of the cask body may also include multiple impact absorber bars 140 fixedly coupled thereto. The bars 140 may be each configured and arranged in appropriate locations on and in a pattern appropriate to meet regulatory requirements (e.g., Nuclear Regulator Commission or NRC) for surviving a postulated cask impact/drop event. In one embodiment, the impact absorber bars 140 may be configured as rectangular blocks of suitable thickness and dimension for the intended purpose. The locking handle assemblies 230 on longitudinal sidewalls 103 of cask body 101 may each be protected between at least a pair of absorber bars 140 located proximately to the assembly on each side. These protective impact absorber bars have depth measured perpendicularly to the exterior surface of the cask body longitudinal sidewalls 103 such that the handle assemblies 230 do not protrude outwards beyond the bars. In one embodiment, the impact absorber bars 140 may be bolted to the cask body and lid (see, e.g., FIGS. 23-26). This allows the bars to be readily replaced if damaged during a cask drop/impact event. In other embodiments, the bars 140 maybe welded thereto.

Each corner 107 of the cask body 101 and corners 205 of lid 200 may be protected by corner impact absorbers 141 fixedly coupled to corner regions. Sets of upper and lower corner impact absorber are provided to cover and shield the lid and adjacent upper corner regions of the cask body, and the bottom wall 102 and adjacent lower corner regions of the cask body, respectively. In one embodiment, the corner impact absorbers 141 may be assemblies comprising an inner corner bracket 142 and outer corner blocks 143 fixedly coupled thereto. Inner corner brackets 142 may be fixedly coupled to the cask body 101 at the lower corners of the body, and the lid and/or cask body at the upper corners. In one embodiment, the inner corner brackets 142 and corner blocks 143 may be fixedly coupled to and movable with lid 200 as shown herein. The inner corner brackets 142 have inward facing concave recesses configured to conform to the perpendicular and squared off corners of the cask body and lid. The outer corner blocks 143 have concave recesses configured to conform to the exterior shape of the inner corner brackets 142. The upper corner impact absorbers 141 extend vertically downwards from the lid over the upper corners of the cask body, and horizontally wrap longitudinally and laterally around the side regions of the corners on both the cask body 101 and lid 200. The upper corner impact absorbers also extend partially over the top of the lid at the corners. The lower corner impact absorbers 141 horizontally wrap longitudinal and laterally around the side regions of the corners on the cask body 101 and bottom wall 102, and partially underneath the bottom wall. In one embodiment, the inner corner brackets 142 and outer corner blocks 143 may be bolted or screwed together via threaded fasteners. The inner corner brackets 142 may in turn be bolted or screws to the cask body 101 and cask body and/or lid 200 via threaded fasteners as applicable.

To facilitate handling the cask 100, each of the longitudinal sidewalls 103 of cask body 101 may include a plurality of outwardly protruding lifting trunnions 150 fixedly attached thereto. Lifting trunnions 150 may be generally cylindrical in configuration and of the retractable type in one embodiment which are known in the art. The lid 200 in turn may include a plurality of lifting lugs 151 for handling the lid. Lugs 151 are fixedly attached to the lid. Lifting lugs may be generally cylindrical in configuration in one embodiment. Any suitable number of lifting trunnions and lugs may be provided as needed to safely lift and maneuver the cask body and lid. Other configurations and constructions of the lifting trunnions and lugs may be provided which are suitable for lifting and maneuvering the weight of cask body and lid in a stable manner.

While the foregoing description and drawings represent some example systems, it will be understood that various additions, modifications, and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method for locking a radioactive waste storage cask comprising:

positioning a closure lid on a cask body over an opening leading into an internal storage cavity;

inserting a peripheral array of first locking protrusions on the lid between and through a peripheral array of second locking protrusions disposed on the cask body around the opening;

slideably moving the first locking protrusions beneath the second locking protrusions; and frictionally engaging the first locking protrusions with the second locking protrusions;

wherein the lid cannot be removed from the cask body.

2. The method according to claim 1, wherein when the first locking protrusions are arranged in spaced apart groups on a plurality of locking bars slideably mounted on the lid, the locking bars being slideably movable relative to the lid.

3. The method according to claim 2, wherein the slideably moving step comprises sliding each of the locking bars from an unlocked position in which the first locking protrusions do not engage the second locking protrusions, to a locked position in which the first locking protrusions are positioned beneath the second locking protrusions.

4. The method according to claim 1, wherein the frictionally engaging step comprises engaging a tapered locking surface on each of the first locking protrusions with a corresponding tapered locking surface on a respective one of the second locking protrusions which locks the lid to the cask body via a wedging action.

5. The method according to claim 4, wherein engaging the tapered locking surfaces of the first and second locking protrusions draws the lid against the cask body in tightened engagement.

6. The method according to claim 5, further comprising compressing a gasket between the lid and the cask body when the lid is drawn against the cask body.

7. The method according to claim 3, wherein the slideably moving step comprises actuating a plurality of hydraulic or pneumatic actuators each coupled to a respective one of the plurality of locking bars which moves the locking bars between the unlocked and locked positions.

8. The method according to claim 7, wherein the actuators are mounted on the lid.

9. The method according to claim 8, wherein each actuator includes an extendible and retractable piston rod fixedly coupled to one of the locking bars.

10. The method according to claim 3, wherein the frictionally engaging step comprises engaging a tapered locking surface on each of the first locking protrusions with a corresponding tapered locking surface on a respective one of the second locking protrusions which locks the lid to the cask body via a wedging action.

11. The method according to claim 10, wherein engaging the tapered locking surfaces of the first and second locking protrusions draws the lid against the cask body in tightened engagement.

12. The method according to claim 5, further comprising compressing a gasket between the lid and the cask body when the lid is drawn against the cask body.

13. The method according to claim 1, wherein the waste storage cask has a horizontally elongated rectangular cuboid configuration.

* * * * *